(12) United States Patent
Eger et al.

(10) Patent No.: US 11,190,383 B2
(45) Date of Patent: Nov. 30, 2021

(54) REDUCING PEAK-TO-AVERAGE POWER RATIO (PAPR) USING PEAK SUPPRESSION INFORMATION MESSAGES

(71) Applicant: QUALCOMM Incorporated, San Diego, CA (US)

(72) Inventors: Ory Eger, Tel Aviv (IL); Ran Berliner, Kfar-Aviv (IL); Assaf Touboul, Netanya (IL); Noam Zach, Kiryat Ono (IL); Sharon Levy, Binyamina (IL); Guy Wolf, Rosh Haayin (IL); Amit Bar-or Tillinger, Tel-Aviv (IL); Shay Landis, Hod Hasharon (IL); Gideon Kutz, Ramat Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/172,915

(22) Filed: Feb. 10, 2021

(65) Prior Publication Data
US 2021/0281457 A1    Sep. 9, 2021

Related U.S. Application Data

(60) Provisional application No. 62/985,150, filed on Mar. 4, 2020, provisional application No. 62/988,804, filed on Mar. 12, 2020.

(51) Int. Cl.
*H04L 27/26* (2006.01)
*H04L 27/34* (2006.01)
(Continued)

(52) U.S. Cl.
CPC ....... *H04L 27/2623* (2013.01); *H04B 7/0456* (2013.01); *H04L 27/2634* (2013.01);
(Continued)

(58) Field of Classification Search
CPC ........... H04L 27/2623; H04L 27/26265; H04L 27/2634; H04L 27/3411; H04L 5/0007; H04B 7/0456; H04W 72/042
See application file for complete search history.

(56) References Cited

U.S. PATENT DOCUMENTS

2002/0105947 A1* 8/2002 Kitagawa ............ H04L 27/2615
370/366
2004/0100210 A1* 5/2004 Hori ....................... H04B 1/707
315/307
(Continued)

FOREIGN PATENT DOCUMENTS

| EP | 2141874 A1 | 1/2010 |
|---|---|---|
| JP | 2001274768 A | 10/2001 |
| JP | 2004336564 A | 11/2004 |

OTHER PUBLICATIONS

International Search Report and Written Opinion—PCT/US2021/017702—ISA/EPO—dated Apr. 29, 2021.

*Primary Examiner* — Siu M Lee
(74) *Attorney, Agent, or Firm* — Norton Rose Fulbright US LLP; Kevin M. Donnelly

(57) ABSTRACT

This disclosure provides methods, devices and systems for reducing PAPR in wireless communications. Some implementations more specifically relate to suppressing the amplitudes of a data signal that exceed a threshold amplitude level. In some implementations, a transmitting device may detect one or more peaks associated with a data signal to be transmitted to a receiving device. A peak may be any sample of a data signal having an amplitude that exceeds a threshold amplitude level. The transmitting device generates peak suppression information indicating the amplitude, a phase and a position of each of the samples associated with the detected peaks. The transmitting device adjusts the data signal by reducing the amplitudes associated with the (Continued)

detected peaks and transmits the adjusted data signal, with the peak suppression information, to the receiving device. In some implementations, the transmitting device may compress the peak suppression information to reduce the overhead of the transmission.

30 Claims, 14 Drawing Sheets

(51) Int. Cl.
*H04B 7/0456* (2017.01)
*H04W 72/04* (2009.01)
*H04L 5/00* (2006.01)

(52) U.S. Cl.
CPC .... *H04L 27/26265* (2021.01); *H04L 27/3411* (2013.01); *H04W 72/042* (2013.01); *H04L 5/0007* (2013.01)

(56) References Cited

U.S. PATENT DOCUMENTS

| | | | |
|---|---|---|---|
| 2007/0121738 A1* | 5/2007 | Yoshii | H04B 1/707 375/260 |
| 2008/0267312 A1* | 10/2008 | Yokoyama | H04L 27/2614 375/267 |
| 2013/0142239 A1* | 6/2013 | Kawasaki | H04B 1/0475 375/224 |

* cited by examiner

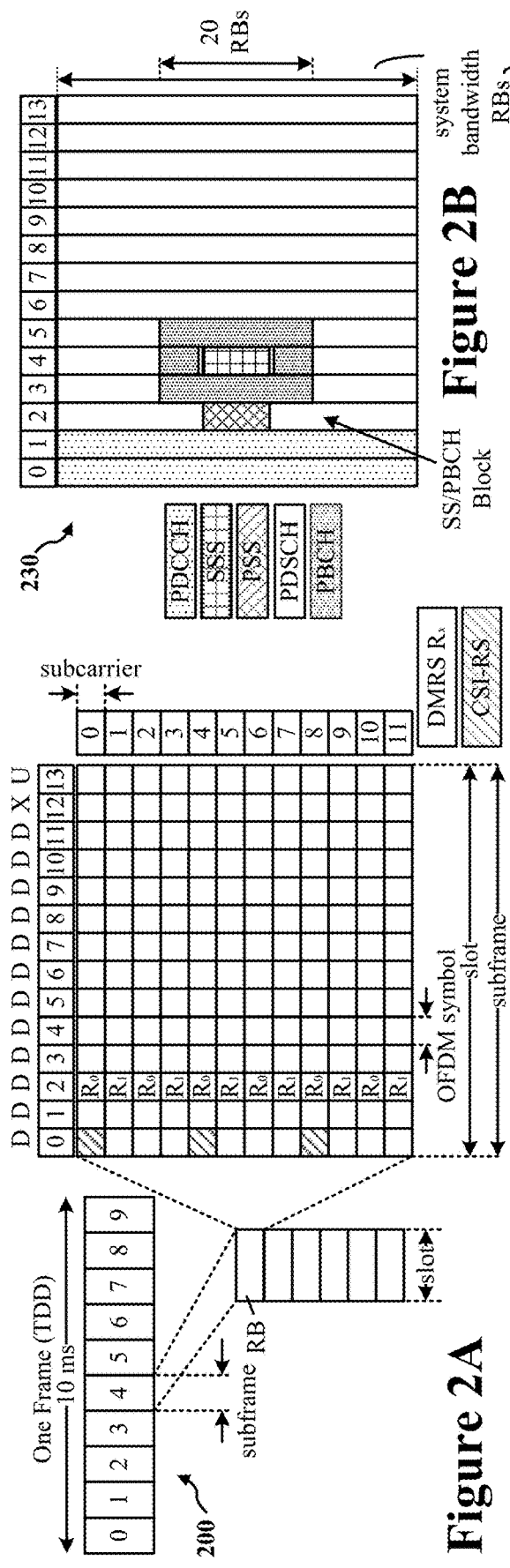
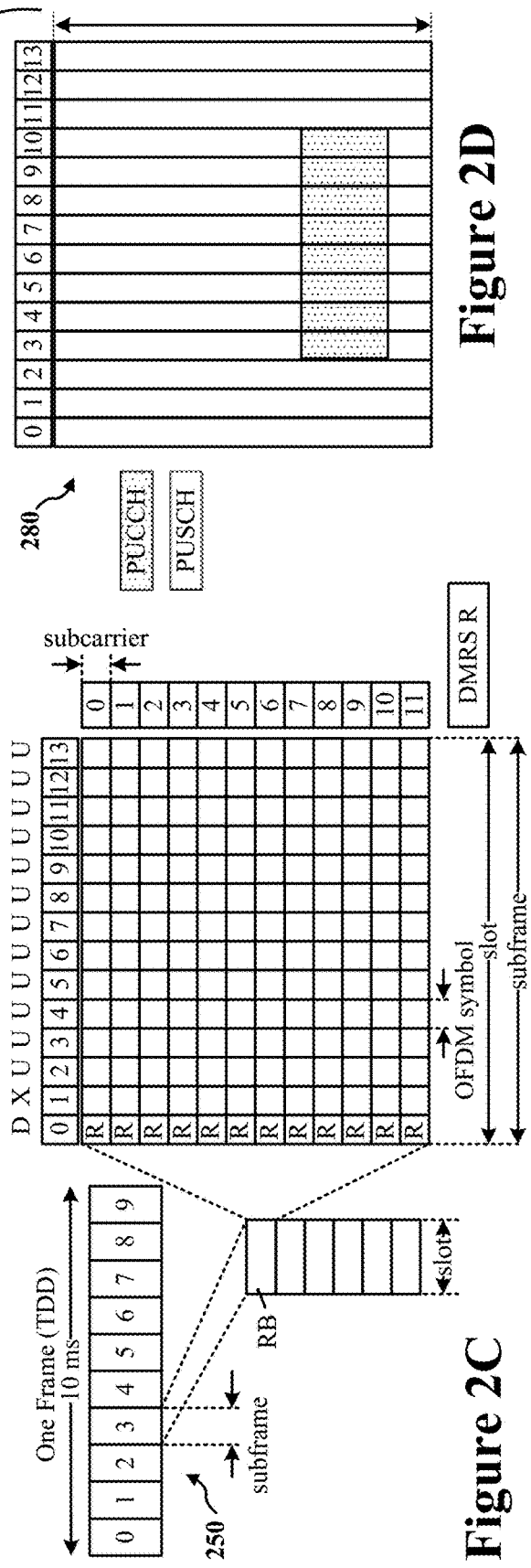
Figure 2A
Figure 2B
Figure 2C
Figure 2D

1110

```
┌─────────────────────────────────────────────────────┐
│ Quantizing the amplitudes of the samples associated with │
│  the one or more peaks into one or more quantization    │
│  levels, where each of the quantization levels represents a │
│       respective range of amplitudes. (1111)           │
└─────────────────────────────────────────────────────┘
                          │
                          ▼
┌ ─ ─ ─ ─ ─ ─ ─ ─ ─ ─ ─ ─ ─ ─ ─ ─ ─ ─ ─ ─ ─ ─ ─ ─ ─ ─ ┐
  Determining a difference between the positions of two
│ samples mapped to the same quantization level. (1112) │
└ ─ ─ ─ ─ ─ ─ ─ ─ ─ ─ ─ ─ ─ ─ ─ ─ ─ ─ ─ ─ ─ ─ ─ ─ ─ ─ ┘
                          │
                          ▼
┌─────────────────────────────────────────────────────┐
│    Mapping the positions of the samples having the     │
│  quantized amplitudes to the respective quantization   │
│     levels, where the compressed peak suppression      │
│  information includes an indication of the positions of the │
│ samples mapped to each of the quantization levels. (1113) │
└─────────────────────────────────────────────────────┘
                          │
                          ▼
┌ ─ ─ ─ ─ ─ ─ ─ ─ ─ ─ ─ ─ ─ ─ ─ ─ ─ ─ ─ ─ ─ ─ ─ ─ ─ ─ ┐
│   Transmitting, to the receiving device, quantization   │
    information indicating at least one of the range of
│ amplitudes associated with each of the quantization levels │
    or an average amplitude of the samples associated with
│        each of the quantization levels. (1114)         │
└ ─ ─ ─ ─ ─ ─ ─ ─ ─ ─ ─ ─ ─ ─ ─ ─ ─ ─ ─ ─ ─ ─ ─ ─ ─ ─ ┘
```

```
┌─────────────────────────────────────────────────────────────┐
│ Determining an amplitude and a position, relative to the data │
│ signal, of each of the one or more peaks based at least in part │
│ on a mapping of the peaks to one or more quantization levels. │
│                          (1211)                              │
└─────────────────────────────────────────────────────────────┘
                              ↓
┌─────────────────────────────────────────────────────────────┐
│      Receiving, from the transmitting device, quantization   │
│   information indicating at least one of a range of amplitudes │
│   associated with each of the quantization levels or an average │
│       amplitude of the samples associated with each of the    │
│                 quantization levels. (1212)                   │
└─────────────────────────────────────────────────────────────┘
                              ↓
┌─────────────────────────────────────────────────────────────┐
│   Integrating differences between the positions of two or more │
│      peaks mapped to the same quantization level. (1213)      │
└─────────────────────────────────────────────────────────────┘
```

Figure 12B

REDUCING PEAK-TO-AVERAGE POWER RATIO (PAPR) USING PEAK SUPPRESSION INFORMATION MESSAGES

CROSS-REFERENCE TO RELATED APPLICATIONS

This application claims the benefit of U.S. Provisional Patent Application No. 62/985,150, entitled, "REDUCING PEAK-TO-AVERAGE POWER RATIO (PAPR) USING PEAK SUPPRESSION INFORMATION MESSAGES," filed on Mar. 4, 2020, and U.S. Provisional Patent Application No. 62/988,804, entitled, "REDUCING PEAK-TO-AVERAGE POWER RATIO (PAPR) USING PEAK SUPPRESSION INFORMATION MESSAGES," filed on Mar. 12, 2020, the disclosure of each of which is hereby incorporated by reference herein in its entirety as if fully set forth below and for all applicable purposes.

TECHNICAL FIELD

This disclosure relates generally to wireless communication and, more specifically, to techniques for reducing peak-to-average power ratio (PAPR) of wireless transmissions.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR), which is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology.

For example, 5G NR introduces higher-order constellations (such as 256 quadrature amplitude modulation (QAM), 1024 QAM, 4K QAM, or 16K QAM, among other examples) which require low error vector magnitude (EVM) to ensure accurate data recovery. EVM is a measure of the distance between the points on a constellation and their ideal locations. Since each constellation point represents a different phase and amplitude combination, to ensure low EVM, the power amplifier of the transmitter should have an operating range large enough to represent the range of amplitudes in a data signal to be transmitted. However, OFDMA signaling techniques tend to yield high peak-to-average power ratios (PAPRs) compared to single-carrier signaling techniques, which may significantly increase power consumption while reducing the efficiency of the power amplifier at the transmitter. Thus, it is desirable to reduce the power consumption of the transmitter while maintaining low EVM at the receiver.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method for wireless communication. The method includes obtaining a plurality of data symbols to be transmitted to a receiving device, applying an inverse fast Fourier transform (IFFT) to the plurality of data symbols to produce a time-domain data signal, and detecting one or more peaks associated with the data signal. Each of the one or more peaks representing a respective sample of the data signal having an amplitude that exceeds a threshold amplitude level. The method also includes generating peak suppression information representing the amplitude, a phase, and a position in the data signal of each of the samples associated with the one or more peaks, compressing the peak suppression information, and compressing the peak suppression information. The method further includes adjusting the data signal by reducing the amplitudes of the samples associated with the one or more peaks and transmitting the adjusted data signal and the compressed peak suppression information, over a wireless channel, to the receiving device.

Another innovative aspect of the subject matter described in this disclosure can be implemented in a wireless communication device. The wireless communication device includes, at least one processor, and at least one memory communicatively coupled with the at least one processor. The at least one memory storing processor-readable code that, when executed by the at least one processor, causes the wireless communication device to apply an IFFT to the plurality of data symbols to produce a time-domain data signal and detect one or more peaks associated with the data signal. Each of the one or more peaks representing a respective sample of the data signal having an amplitude that exceeds a threshold amplitude level. The processor-readable code that, when executed by the at least one processor, further causes the wireless communication device to generate peak suppression information representing the amplitude, a phase, and a position in the data signal of each of the samples associated with the one or more peaks. The processor-readable code that, when executed by the at least one processor, also causes the wireless communication device to compress the peak suppression information, adjust the data signal by reducing the amplitudes of the samples associated with the one or more peaks, and transmit the adjusted data signal and the compressed peak suppression information, over a wireless channel, to the receiving device.

Another innovative aspect of the subject matter described in this disclosure can be implemented in an apparatus configured for wireless communication. The apparatus includes means for obtaining a plurality of data symbols to be transmitted to a receiving device, means for applying an IFFT to the plurality of data symbols to produce a time-domain data signal, and means for detecting one or more peaks associated with the data signal. Each of the one or more peaks representing a respective sample of the data signal having an amplitude that exceeds a threshold amplitude level. The apparatus also includes means for generating peak suppression information representing the amplitude, a phase, and a position in the data signal of each of the samples associated with the one or more peaks. The apparatus further includes means for compressing the peak suppression information, means for adjusting the data signal by reducing the amplitudes of the samples associated with the one or more peaks, and means for transmitting the adjusted data signal and the compressed peak suppression information, over a wireless channel, to the receiving device.

Another innovative aspect of the subject matter described in this disclosure can be implemented in a non-transitory computer-readable medium storing instructions that, when executed by a processor, cause the processor to perform operations including obtaining a plurality of data symbols to be transmitted to a receiving device, applying an IFFT to the plurality of data symbols to produce a time-domain data signal, and detecting one or more peaks associated with the data signal. Each of the one or more peaks representing a respective sample of the data signal having an amplitude that exceeds a threshold amplitude level. The operations further including generating peak suppression information representing the amplitude, a phase, and a position in the data signal of each of the samples associated with the one or more peaks. The operations also including compressing the peak suppression information, adjusting the data signal by reducing the amplitudes of the samples associated with the one or more peaks, and transmitting the adjusted data signal and the compressed peak suppression information, over a wireless channel, to the receiving device.

Another innovative aspect of the subject matter described in this disclosure can be implemented in a method for wireless communication. The method includes receiving a data signal and a peak suppression signal from a transmitting device, applying a fast Fourier transform (FFT) to the received data signal to produce a first portion of a plurality of data symbols, and applying the FFT to the peak suppression signal to produce one or more peak suppression symbols. The method also includes demodulating the peak suppression symbols to recover peak suppression information, and recreating one or more peaks based on the peak suppression information. The one or more peaks being representative of respective samples of the data signal. The method further includes generating a second portion of the plurality of data symbols based at least in part on the one or more peaks, reconstructing the plurality of data symbols by combining the first portion with the second portion, and demodulating the plurality of data symbols to recover data transmitted by the transmitting device.

Another innovative aspect of the subject matter described in this disclosure can be implemented in a wireless communication device. The wireless communication device includes at least one processor and at least one memory communicatively coupled with the at least one processor. The at least one memory storing processor-readable code that, when executed by the at least one processor, causes the wireless communication device to receive a data signal and a peak suppression signal from a transmitting device, apply an FFT to the received data signal to produce a first portion of a plurality of data symbols, and apply the FFT to the peak suppression signal to produce one or more peak suppression symbols. The processor-readable code that, when executed by the at least one processor, also causes the wireless communication device to demodulate the peak suppression symbols to recover peak suppression information, and recreate one or more peaks based on the peak suppression information. The one or more peaks being representative of respective samples of the data signal. The processor-readable code that, when executed by the at least one processor, further causes the wireless communication device to generate a second portion of the plurality of data symbols based at least in part on the one or more peaks, reconstruct the plurality of data symbols by combining the first portion with the second portion, and demodulate the plurality of data symbols to recover data transmitted by the transmitting device.

Another innovative aspect of the subject matter described in this disclosure can be implemented in an apparatus configured for wireless communication. The apparatus includes means for receiving a data signal and a peak suppression signal from a transmitting device, means for applying an FFT to the received data signal to produce a first portion of a plurality of data symbols, and means for applying the FFT to the peak suppression signal to produce one or more peak suppression symbols. The apparatus includes means for demodulating the peak suppression symbols to recover peak suppression information and means for recreating one or more peaks based on the peak suppression information. The one or more peaks being representative of respective samples of the data signal. The apparatus further includes means for generating a second portion of the plurality of data symbols based at least in part on the one or more peaks, means for reconstructing the plurality of data symbols by combining the first portion with the second portion, and means for demodulating the plurality of data symbols to recover data transmitted by the transmitting device.

Another innovative aspect of the subject matter described in this disclosure can be implemented in a non-transitory computer-readable medium storing instructions that, when executed by a processor, cause the processor to perform operations including receiving a data signal and a peak suppression signal from a transmitting device, applying an FFT to the received data signal to produce a first portion of a plurality of data symbols, and applying the FFT to the peak suppression signal to produce one or more peak suppression symbols. The operations also include demodulating the peak suppression symbols to recover peak suppression information and recreating one or more peaks based on the peak suppression information. The one or more peaks being representative of respective samples of the data signal. The operations further including generating a second portion of the plurality of data symbols based at least in part on the one or more peaks, reconstructing the plurality of data symbols by combining the first portion with the second portion, and demodulating the plurality of data symbols to recover data transmitted by the transmitting device.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 2A, 2B, 2C, and 2D show examples of a first 5G/New Radio (NR) frame, downlink (DL) channels within a 5G/NR slot, a second 5G/NR frame, and uplink (UL) channels within a 5G/NR slot, respectively, according to one or more aspects.

FIG. 11B shows a flowchart illustrating an example process for wireless communication that supports reducing PAPR using peak suppression information messages according to one or more aspects.

FIG. 12B shows a flowchart illustrating an example process for wireless communication that supports reducing PAPR using peak suppression information messages according to one or more aspects.

Like reference numbers and designations in the various drawings indicate like elements.

DETAILED DESCRIPTION

Figure 1:
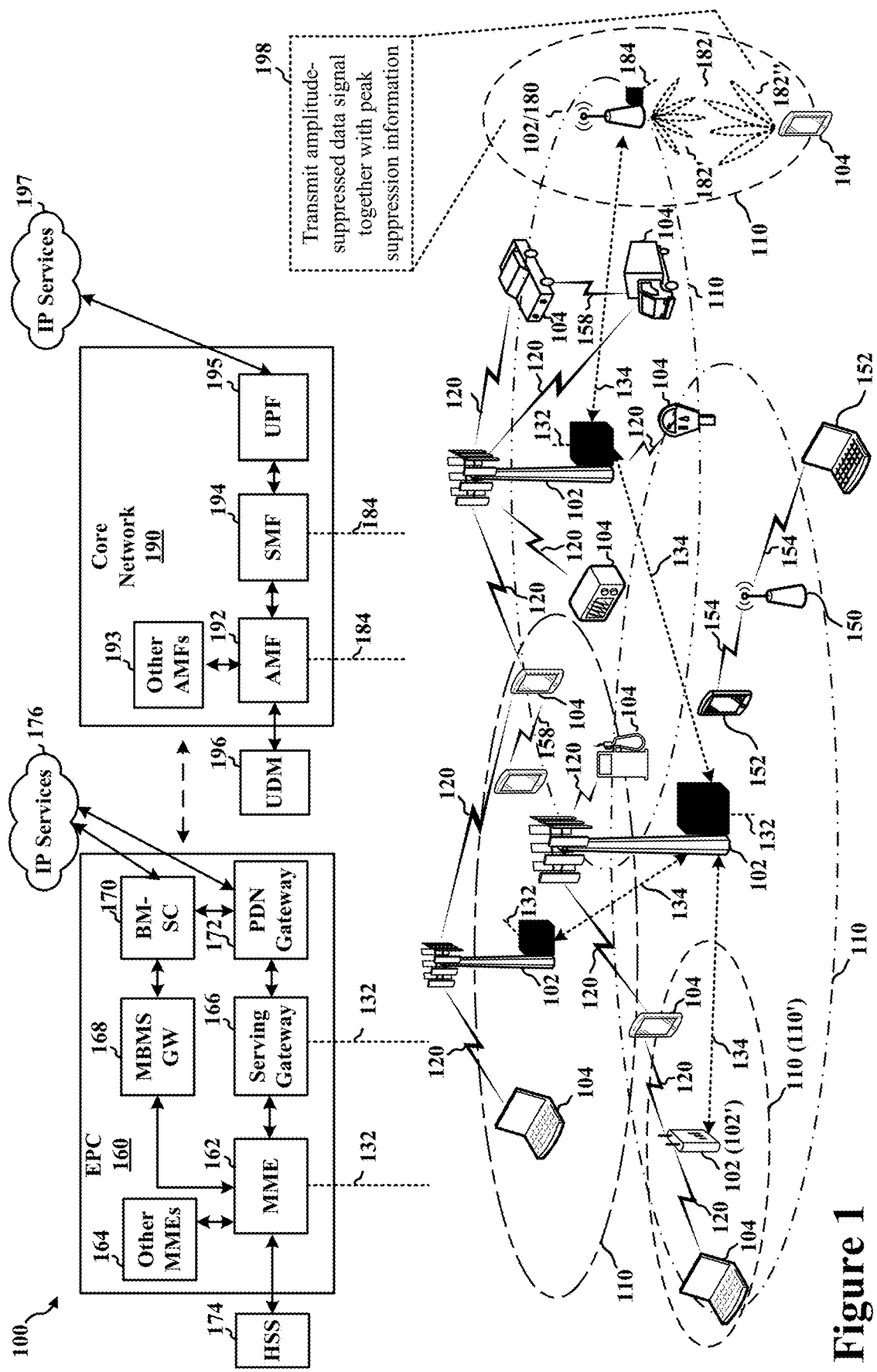
FIG. 1 a diagram of an example wireless communications system and an access network according to one or more aspects.

The following description is directed to some particular implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Long Term Evolution (LTE), 3G, 4G or 5G (New Radio (NR)) standards promulgated by the 3rd Generation Partnership Project (3GPP), the Institute of Electrical and Electronics Engineers (IEEE) 802.11 standards, the IEEE 802.15 standards, or the Bluetooth® standards as defined by the Bluetooth Special Interest Group (SIG), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless wide area network (WWAN), a wireless personal area network (WPAN), a wireless local area network (WLAN), or an internet of things (JOT) network.

Various implementations relate generally to reducing power consumption in wireless communication devices. Some implementations more specifically relate to reducing a peak-to-average power ratio (PAPR) of a transmitting device by suppressing the amplitudes of a data signal that exceed a threshold amplitude level and transmitting the data signal, together with information describing the suppressed amplitudes, to a receiving device. In some implementations, the transmitting device applies an inverse fast Fourier transform (IFFT) to data symbols to be transmitted to a receiving device, which produces a time-domain data signal. The transmitting device may detect one or more peaks associated with the data signal. As used herein, the term "peak" refers to any sample of a data signal (such as produced by the IFFT) having an amplitude that exceeds a threshold amplitude level. The transmitting device further generates peak suppression information indicating at least the amplitudes and the positions of the samples associated with the detected peaks. The transmitting device adjusts the data signal by reducing the amplitudes of the samples associated with the detected peaks and transmits the adjusted data signal, together with the peak suppression information, to the receiving device. In some implementations, the transmitting device may compress the peak suppression information to reduce the overhead of the transmission.

Particular implementations of the subject matter described in this disclosure can be implemented to realize one or more of the following potential advantages. By suppressing the amplitudes of detected peaks in a data signal, aspects of the present disclosure may significantly reduce the PAPR associated with wireless transmissions. The reduction in PAPR improves the power efficiency of the power amplifier and reduces power consumption by the transmitting device. Some implementations enable such PAPR reduction while maintaining an acceptable error vector magnitude (EVM). EVM is a measure of the distance between the points on a constellation diagram (used for signal modulation) and their ideal locations. Since each constellation point represents a different phase and amplitude combination, reducing the amplitudes of some of the samples of the data signal may degrade EVM at the transmitter. However, transmitting the peak suppression information together with the amplitude-suppressed data signal enables the receiving device to reconstruct the peaks in the received data signal. As a result, the receiving device may demodulate and decode the received data symbols without loss of precision or accuracy. Accordingly, aspects of the present disclosure may reduce power consumption at the transmitter while maintaining low EVM at the receiver.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 shows a diagram of an example wireless communications system and an access network 100. The wireless communications system (also referred to as a WWAN) includes base stations 102, UEs 104, an Evolved Packet Core (EPC) 160, and another core network 190 (e.g., a 5G Core (5GC)). The base stations 102 may include macrocells (high power cellular base station), small cells (low power cellular base station), or a combination thereof. The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use MIMO antenna technology, including spatial multiplexing, beamforming, transmit diversity, or a combination thereof. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed frequency spectrum, an unlicensed frequency spectrum, or a combination thereof. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to the access network, increase capacity of the access network, or a combination thereof.

A base station 102, whether a small cell 102' or a large cell (e.g., macro base station), may include an eNB, gNodeB (gNB), or another type of base station. Some base stations, such as gNB 180, may operate in a traditional sub 6 GHz spectrum, in millimeter wave (mmW) frequencies, near mmW frequencies, or a combination thereof, in communication with the UE 104. When the gNB 180 operates in mmW or near mmW frequencies, the gNB 180 may be referred to as a millimeter wave or mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, other IP services, or a combination thereof. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, other IP services, or a combination thereof, as illustrative, non-limiting examples.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the base station 102/180 may be configured to transmit amplitude-suppressed data signals, together with peak suppression information, to the UE 104 (198). For example, the base station 102/180 may generate the amplitude-suppressed data signals by limiting the PAPR of outgoing data signals (to be transmitted to the UE 104) to within a threshold range. Samples (of a data signal) having amplitudes that exceed the threshold range may be referred to herein as "peaks," and the amplitudes of such peaks may be referred to herein as "peak amplitudes." In some implementations, the base station 102/180 may substitute or replace peak amplitudes in a data signal with a known or preconfigured amplitude that is within the threshold range. The peak suppression information may identify or otherwise indicate the peaks and peak amplitudes associated with the amplitude-suppressed data signals. As a result, the UE 104 may recreate the original data signals by substituting the peaks (or peak amplitudes) for respective samples of the amplitude-suppressed data signals.

FIG. 2A shows an example of a first slot 200 within a 5G/NR frame structure. FIG. 2B shows an example of DL channels 230 within a 5G/NR slot. FIG. 2C shows an example of a second slot 250 within a 5G/NR frame structure. FIG. 2D shows an example of UL channels 280 within a 5G/NR slot. The 5G/NR frame structure may be FDD in which, for a particular set of subcarriers (carrier system bandwidth), slots within the set of subcarriers are dedicated for either DL or UL In other cases, the 5G/NR frame structure may be TDD in which, for a particular set of subcarriers (carrier system bandwidth), slots within the set of subcarriers are dedicated for both DL and UL. In the examples shown in FIGS. 2A and 2C, the 5G/NR frame structure is configured as TDD, with slot 4 being configured with slot format 28 (with mostly DL), where D indicates DL, U indicates UL, and X indicates that the slot is flexible for use between DL/UL, and slot 3 being configured with slot format 34 (with mostly UL). While slots 3 and 4 are shown with slot formats 34 and 28, respectively, any particular slot may be configured with any of the various available slot formats 0-61. Slot formats 0 and 1 are all DL and all UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). This format may also apply to a 5G/NR frame structure that is FDD.

Other wireless communication technologies may have a different frame structure, different channels, or a combination thereof. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu*15$ kKz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=0$ with 1 slot per subframe. The subcarrier spacing is 15 kHz and symbol duration is approximately 66.7 $\mu$s.

A resource grid may be used to represent the frame structure. Each time slot includes a resource block (RB) (also referred to as a physical RB (PRB)) that extends across 12 consecutive subcarriers and across a number of symbols. The intersections of subcarriers and symbols of the RB define multiple resource elements (REs). The number of bits carried by each RE depends on the modulation scheme.

As illustrated in FIG. 2A, some of the REs carry a reference (pilot) signal (RS) for the UE. In some configurations, one or more REs may carry a demodulation RS (DM-RS) (indicated as Rx for one particular configuration, where 100× is the port number, but other DM-RS configurations are possible). In some configurations, one or more REs may carry a channel state information reference signal (CSI-RS) for channel measurement at the UE. The REs may also include a beam measurement RS (BRS), a beam refinement RS (BRRS), and a phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe or symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), UCI, or a combination thereof.

Figure 3:
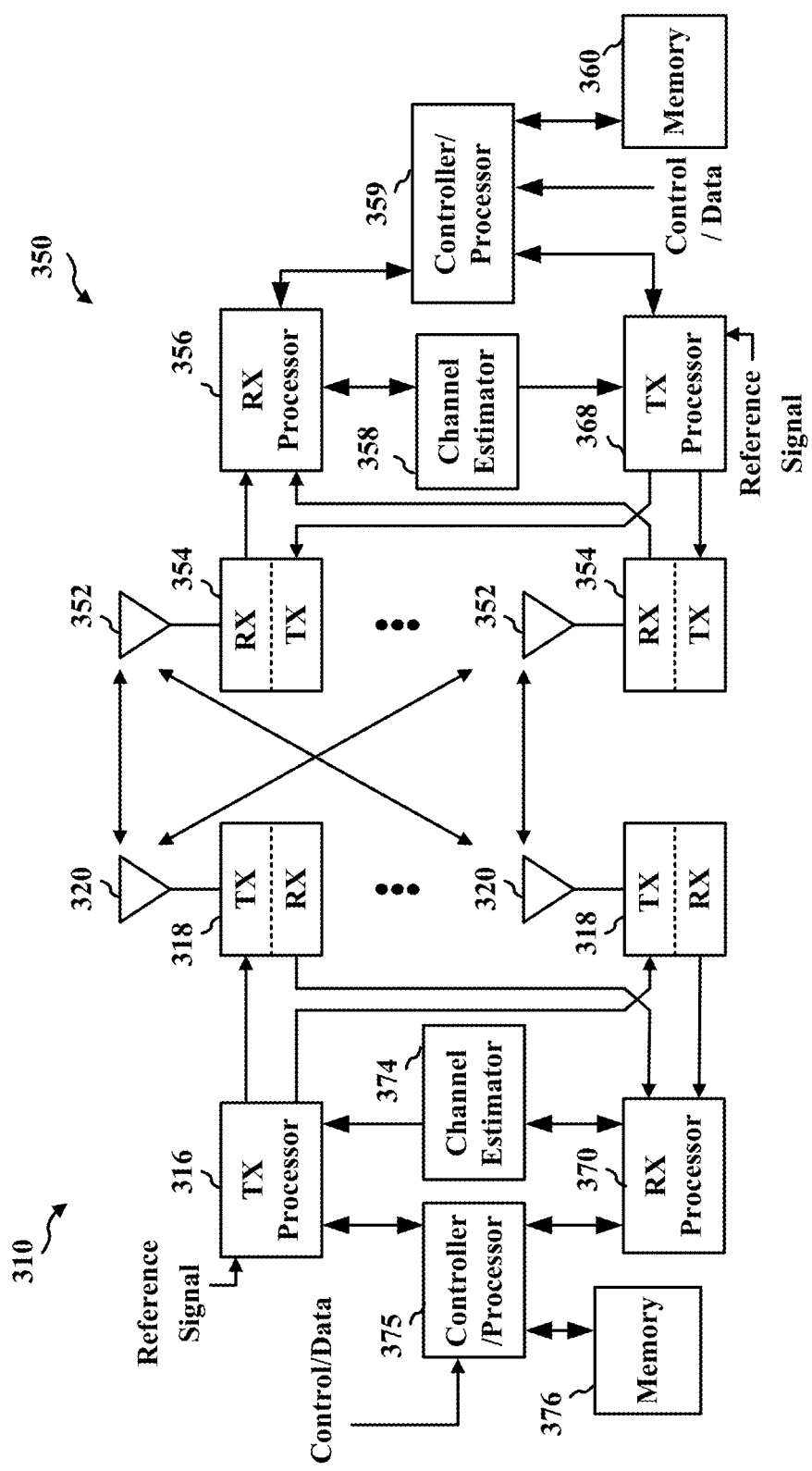
FIG. 3 a block diagram illustrating examples of a base station and a user equipment (UE) according to one or more aspects.

FIG. 3 shows a block diagram of an example base station 310 and UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time domain, the frequency domain, or a combination thereof, and then combined together using an IFFT to produce a physical channel carrying a time domain OFDM symbol stream. The OFDM stream is spatially pre-coded to produce multiple spatial streams. Channel estimates from a channel estimator 374 may be used to determine the coding and modulation scheme, as well as for spatial processing. The channel estimate may be derived from a reference signal, channel condition feedback, or a combination thereof, transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK protocol, NACK protocol, or a combination thereof, to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK protocol, a NACK protocol, or a combination thereof to support HARQ operations. Information to be wirelessly communicated (such as for LTE or NR based communications) is encoded and mapped, at the PHY layer, to one or more wireless channels for transmission.

As described above, 5G NR introduces higher-order constellations (such as 256 QAM, 1024 QAM, 4K QAM, or 16K QAM, among other examples) which require low EVM to ensure accurate data recovery. EVM is a measure of the distance between the points on a constellation and their ideal locations. Since each constellation point represents a different phase and amplitude combination, to ensure low EVM at a transmitter, the power amplifier of the transmitter should have a sufficiently large operating range to represent the range of amplitudes in a data signal to be transmitted. However, OFDMA signaling techniques tend to yield high peak-to-average power ratios (PAPRs) compared to single-carrier signaling techniques, which may significantly increase power consumption while reducing the efficiency of the power amplifier at the transmitter.

Various implementations relate generally to reducing power consumption in wireless communication devices. Some implementations more specifically relate to reducing a PAPR of a transmitting device by suppressing the amplitudes of a data signal that exceed a threshold amplitude level and transmitting the data signal, together with information describing the suppressed amplitudes, to a receiving device. In some implementations, the transmitting device applies an IFFT to data symbols to be transmitted to a receiving device, which produces a time-domain data signal. The transmitting device may detect one or more peaks associated with the data signal. As used herein, the term "peak" refers to any sample of a data signal (such as produced by the IFFT) having an amplitude that exceeds a threshold amplitude level and the amplitudes of such peaks are referred to as "peak amplitudes." The transmitting device further generates peak suppression information indicating at least the amplitudes and the positions of the samples associated with the detected peaks. The transmitting device adjusts the data signal by reducing the amplitudes of the samples associated with the detected peaks and transmits the adjusted data signal, together with the peak suppression information, to the receiving device. In some implementations, the transmitting device may compress the peak suppression information to reduce the overhead of the transmission.

Particular implementations of the subject matter described in this disclosure can be implemented to realize one or more of the following potential advantages. By suppressing the amplitudes of detected peaks in a data signal, aspects of the present disclosure may significantly reduce the PAPR associated with wireless transmissions. The reduction in PAPR improves the power efficiency of the power amplifier and reduces power consumption by the transmitting device. Since each point on a constellation diagram (used for signal modulation) represents a different phase and amplitude combination, reducing the amplitudes of some of the samples of the data signal may degrade EVM at the transmitter. However, transmitting the peak suppression information together with the amplitude-suppressed data signal enables the receiving device to reconstruct the peaks in the received data signal. As a result, the receiving device may demodulate and decode the received data symbols without loss of precision or accuracy. Accordingly, aspects of the present disclosure may reduce power consumption at the transmitter while maintaining low EVM at the receiver.

Figure 4:
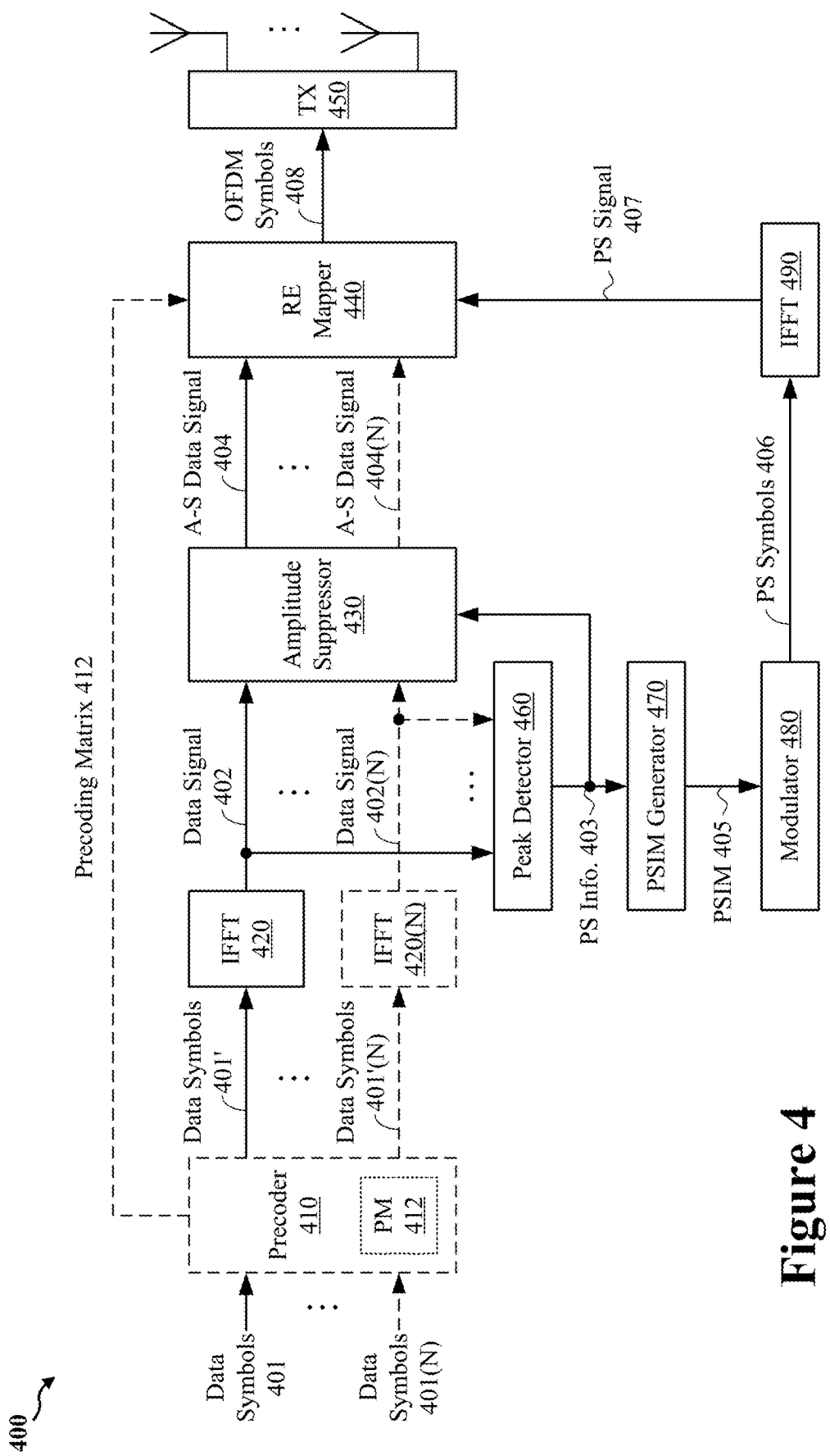
FIG. 4 shows an example transmit (TX) chain of a wireless communication device according to one or more aspects.

FIG. 4 shows an example transmit (TX) chain 400 of a wireless communication device according to some implementations. In some implementations, the wireless device may be a base station such as base stations 102 or 310 of FIGS. 1 and 3, respectively. With reference for example to FIG. 3, the TX chain 400 may be an example of the TX processor 316 and the transmitter 318TX. In some other implementations, the wireless device may be a UE such as UEs 104 or 350 of FIGS. 1 and 3, respectively. With reference for example to FIG. 3, the TX chain 400 may be an example of the TX processor 368 and the transmitter 354TX. As shown in FIG. 4, solid lines depict data paths used for MIMO and non-MIMO implementations of the TX chain 400 whereas dotted (or phantom) lines depict additional data paths used only for MIMO implementations of the TX chain 400.

The TX chain 400 includes a first IFFT 420, an amplitude suppressor 430, a resource element (RE) mapper 440, a transmitter (TX) 450, a peak detector 460, a peak suppression information message (PSIM) generator 470, a modulator 480, and a second IFFT 490. For non-MIMO implementations, the TX chain 400 may obtain data symbols 401 to be transmitted to a receiving device. The data symbols 401 may be modulated using various digital modulation techniques. Example modulation techniques include, but are not limited to, phase-shift keying (PSK) and quadrature amplitude modulation (QAM). Thus, each of the data symbols 401 may correspond to a point on a constellation graph of the in-phase (I) and quadrature (Q) components of the modulated subcarriers. Each constellation point can be represented by a modulated amplitude and phase.

The IFFT 420 converts the data symbols 401 from the frequency domain to the time domain. For example, the IFFT 420 may produce a series of time-varying samples representative of the data symbols 401. In some aspects, the data symbols 401 may be parallelized (by a serial-to-parallel converter, not shown for simplicity) at the input of the IFFT 420, and the resulting samples may be serialized (by a parallel-to-serial converter, not shown for simplicity) at the output of the IFFT 420. The sequence of samples output by the IFFT 420 represents a time-domain data signal 402. In some instances, the data signal 402 may include one or more samples (or peaks) having amplitudes that are substantially higher than the average amplitude of the remaining samples. Such samples may be referred to herein as "peaks," and the amplitudes of the samples may be referred to as "peak amplitudes."

Figure 5A:
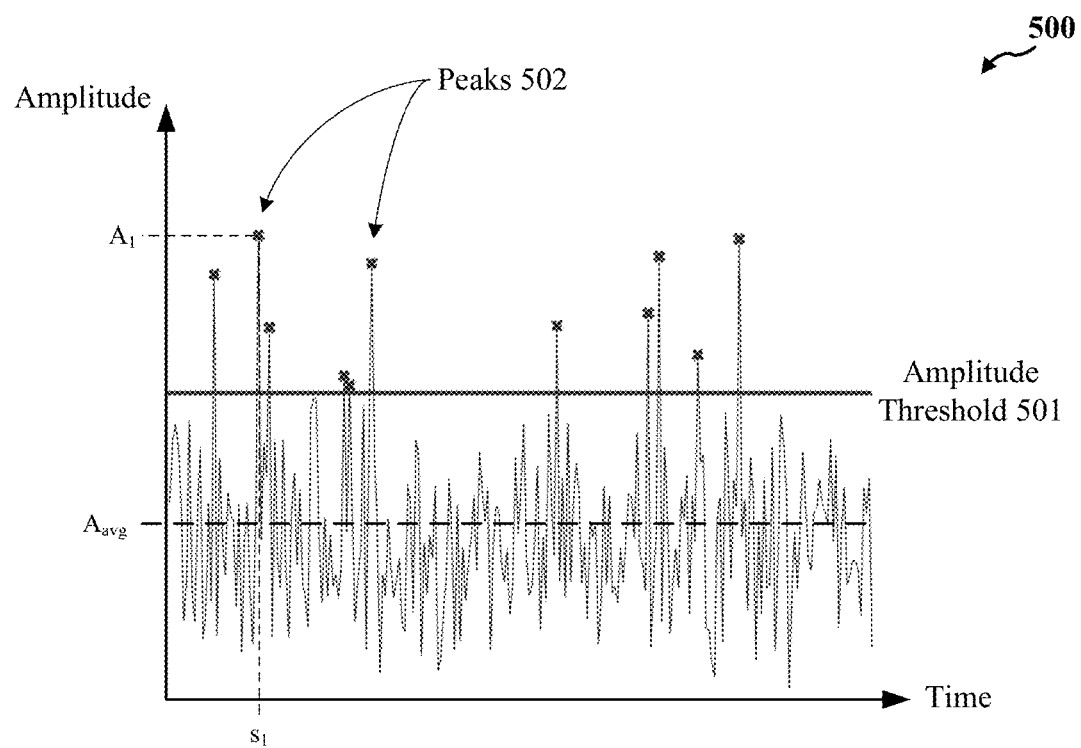
FIG. 5A shows an example data signal usable for communications between wireless communication devices according to one or more aspects.

FIG. 5A shows an example data signal 500 usable for communications between wireless communication devices according to some implementations. In some implementations, the data signal 500 may be one example of the data signal 402 of FIG. 4. As shown in FIG. 5A, the average amplitude (Aavg) of the data signal 500 is less than an amplitude threshold 501. In some implementations, the amplitude threshold 501 may be determined based, at least in part, on the average amplitude of the data signal 500 and a target or desired PAPR. For example, the amplitude threshold 501 may be chosen as a cut-off for limiting the PAPR of the data signal 500. However, the data signal 500 also includes a number of peaks 502. Although only two of the peaks 502 are highlighted in the example of FIG. 5A, the peaks 502 may include any samples of the data signal 500 having amplitudes that exceed the amplitude threshold 501. Each peak 502 may have a unique position (sn) in the data signal 502, an amplitude (An), and a phase (not shown for simplicity). For example, the peak 502 at position s1 has an amplitude A1 that is significantly higher than the amplitude threshold 501. The presence of the peaks 502 may significantly increase the PAPR of the data signal 500.

In some implementations, the TX chain 400 may be configured to reduce or mitigate the PAPR of the data signal 402 by suppressing the amplitudes of one or more peaks. For example, the peak detector 460 may detect one or more peaks in the data signal 402 and generate peak suppression (PS) information 403 describing or identifying the detected peaks. With reference for example to FIG. 5A, the PS information 403 may include the positions (sn), amplitudes (An), and phases (not shown) of the peaks 502. In some aspects, the PS information 403 may be provided to the amplitude suppressor 430. The amplitude suppressor 430 may adjust the data signal 402 by reducing or suppressing the amplitudes of the samples associated with the peaks. More specifically, the amplitude suppressor 430 may generate an amplitude-suppressed (A-S) data signal 404 by replacing or substituting each of the peak amplitudes in the data signal 402 with a suppressed amplitude. In some implementations, the suppressed amplitude may be a known or preconfigured amplitude value that is less than or equal to a corresponding amplitude threshold.

Figure 5B:
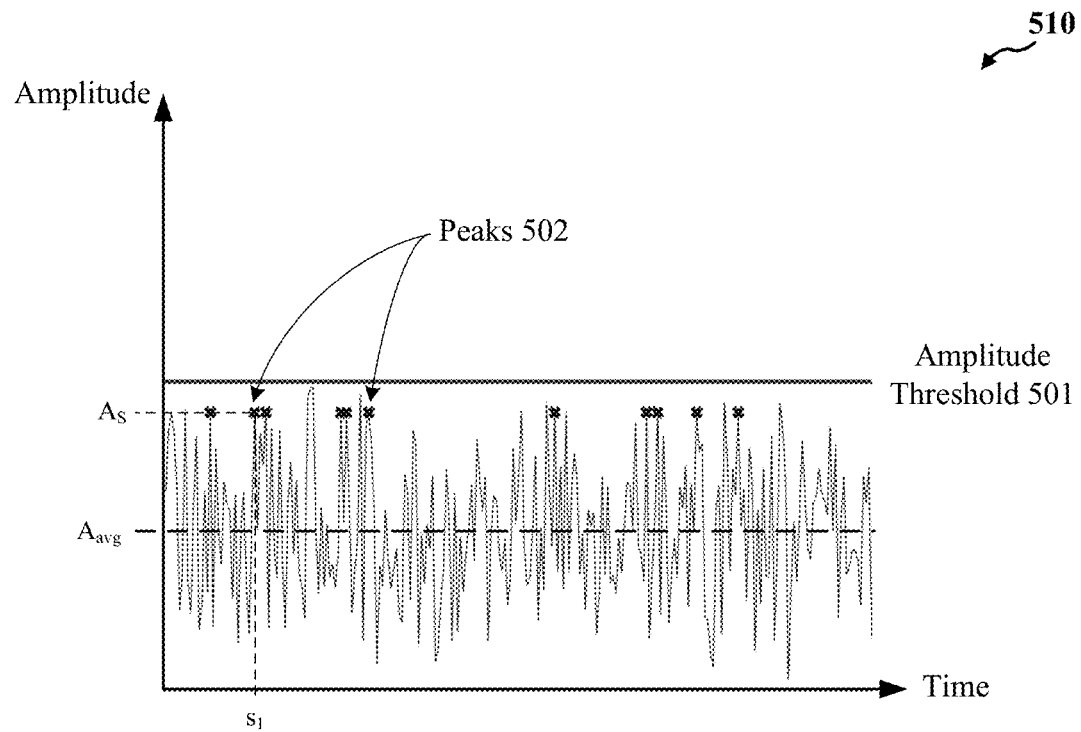
FIG. 5B shows another example data signal usable for communications between wireless communication devices according to one or more aspects.

FIG. 5B shows another example data signal 510 usable for communications between wireless communication devices according to some implementations. In some implementations, the data signal 510 may be one example of the A-S data signal 404 of FIG. 4. More specifically, the data signal 510 may be an example of the data signal 500, of FIG. 5A, after suppressing the amplitudes of the peaks 502. Compared to the data signal 500 of FIG. 5A, the amplitude of the data signal 510 never exceeds the amplitude threshold 501. More specifically, the amplitude of each of the peaks 502 has been reduced to a suppressed amplitude value (AS) in the data signal 510. In some implementations, each of the peaks 502 may be reduced to the same suppressed amplitude value. In some other implementations, different peaks 502 may be reduced to different suppressed amplitude values. The suppressed amplitude values may include any amplitude values less than or equal to the amplitude threshold 501. As a result, the PAPR of the data signal 510 is significantly lower than the PAPR of the data signal 500 of FIG. 5A.

Aspects of the present disclosure recognize that chopping (or reducing) the peak amplitudes of a data signal may degrade EVM at the transmitter. For example, the EVM of the A-S data signal 404 may be worse than the EVM of the original data signal 402. In some implementations, the TX chain 400 may provide or otherwise indicate the PS information 403 to the receiving device to compensate for the degradation in EVM of the A-S data signal 404. For example, the PSIM generator 470 may generate a peak suppression information message (PSIM) 405 based on the PS information 403. In some aspects, the PSIM 405 may include raw data representative of the PS information 403 (including the position, amplitude, and phase of each peak).

In some other aspects, the PSIM 405 may be a compressed form of the PS information 403. For example, it is noted that the amplitude suppressor 430 does not alter the phases of the data signal 402 when generating the A-S data signal 404. Accordingly, the phase information may be excluded from the PSIM 405 to reduce the overhead of the message. The peak amplitudes also may be represented as polar amplitudes in the PSIM 405. By using the polar notation, the amplitudes of the peaks may be reduced without changing their phases. Other suitable compression techniques may include, but are not limited to, wavelet compression, per-antenna representation of the position of each peak, analog coding, and limiting the peak position vector to a number of known options. In some implementations, the PSIM generator 470 may compress the PS information 403 by quantizing the peak amplitudes into one or more quantization levels.

Figure 6:
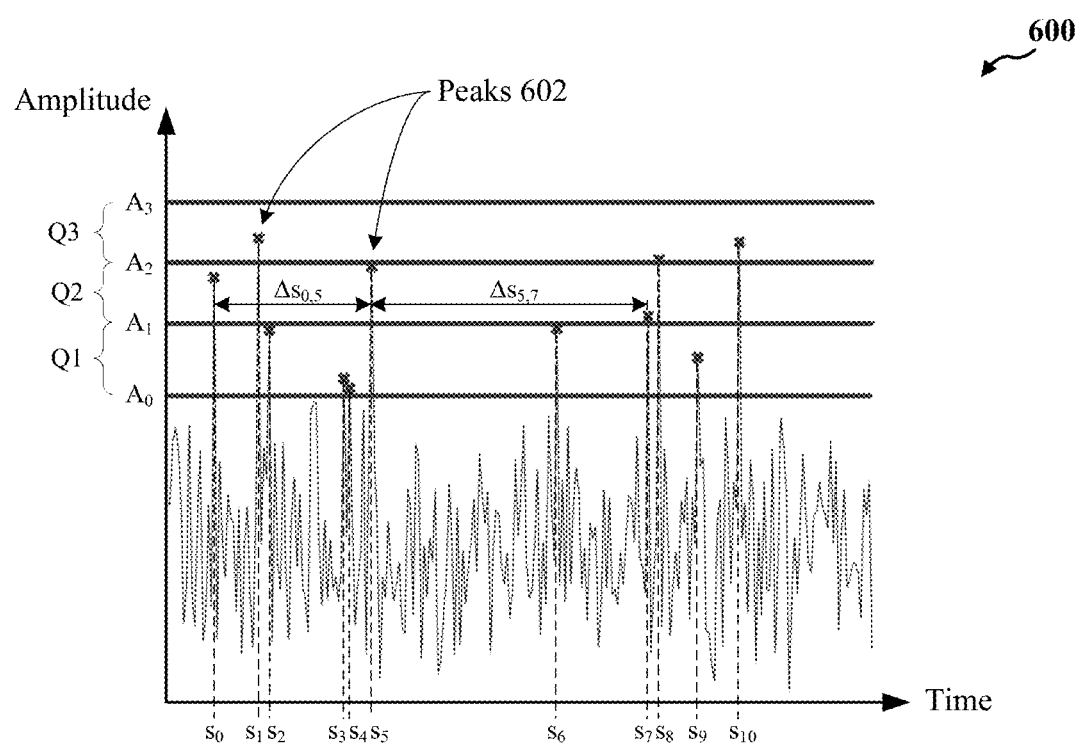
FIG. 6 shows another example data signal usable for communications between wireless communication devices according to one or more aspects.

FIG. 6 shows another example data signal 600 usable for communications between wireless communication devices according to some implementations. In some implementations, the data signal 600 may be one example of the data signal 402 of FIG. 4. As shown in FIG. 6, the data signal 600 includes eleven peaks 602 having respective positions s0-s10 in the data signal 600. Each of the peaks 602 has a respective amplitude residing within one of three quantization levels Q1-Q3. Each of the quantization levels Q1, Q2, and Q3 represents a range of amplitudes A0-A1, A1-A2, and A2-A3, respectively. In some implementations, the amplitude of each peak 602 may be quantized or represented by the quantization level Q1, Q2, or Q3 in which it resides. For example, the amplitudes of the peaks in positions s1, s8, and s10 may be quantized as quantization level Q3, the amplitudes of the peaks in positions s0, s5, and s7 may be quantized as quantization level Q2, and the amplitudes of the peaks in positions s2-s4, s6, and s9 may be quantized as quantization level Q1. In other implementations, the peaks 602 may be quantized into fewer or more quantization levels than those depicted in FIG. 6.

In some implementations, the PSIM 405 may include an indication of the quantization levels Q1-Q3 and a mapping of each of the peaks 602 to one of the quantization levels. More specifically, for each quantization level, the PSIM 405 may indicate the positions of the peaks 602 (or samples of the data signal 600) having amplitudes represented by that quantization level. For example, positions s1, s8, and s10 may be mapped to quantization level Q3, positions s0, s5, and s7 may be mapped to quantization level Q2, and positions s2-s4, s6, and s9 may be mapped to quantization level Q1. In some implementations, the transmitting device may transmit quantization information to the receiving device indicating the amplitude ranges (A0-A1, A1-A2, and A2-A3) associated with each of the quantization level Q1-Q3. In some other implementations, the quantization information may indicate an average (mean or median) amplitude of the peaks 602 associated with each quantization level Q1-Q3. The quantization information enables the receiving device to determine the quantized amplitudes of each of the peaks 602 based on the mapping of the peaks 602 to the quantization levels in the PSIM 405.

In some implementations, the PSIM generator 470 may further reduce the size or overhead of the PSIM 405 by representing the positions of at least some of the peaks 602 as differential values. For example, a 4K IFFT may produce 4096 time-domain samples. Thus, in the example of FIG. 6, 12 bits would be needed represent each of the peaks 602. Aspects of the present disclosure recognize that, by quantizing the peak amplitudes, multiple peaks may be associated with the same quantization level. Thus, at least some of the peaks 602 may be characterized by their distances to other peaks 602 in the same quantization level. For example, position s5 may be represented as position s0 plus the difference between positions s0 and s5 (Δs0,5). Similarly, position s7 may be represented as position s5 (s0+Δs0,5) plus the difference between positions s5 and s7 (Δs5,7). Thus, the position of only one of the peaks 602 in each quantization level (the "initial peak position") needs to be individually represented in the PSIM 405 (12 bits), and the positions of the remaining peaks 602 in the same quantization level may be represented by their distances to the initial peak position (<12 bits).

The modulator 480 maps the PSIM 405 to one or more PS symbols 406 using digital modulation techniques. Example modulation techniques include, but are not limited to, phase-shift keying (PSK) and QAM. The IFFT 490 then converts the PS symbols 406 from the frequency domain to the time domain. For example, the IFFT 490 may produce a series of time-varying samples representative of the PS symbols 406. In some aspects, the PS symbols 406 may be parallelized (by a serial-to-parallel converter, not shown for simplicity) at the input of the IFFT 490, and the resulting samples may be serialized (by a parallel-to-serial converter, not shown for simplicity) at the output of the IFFT 490. The sequence of samples output by the IFFT 490 represents a time-domain PS signal 407.

Figure 7A:
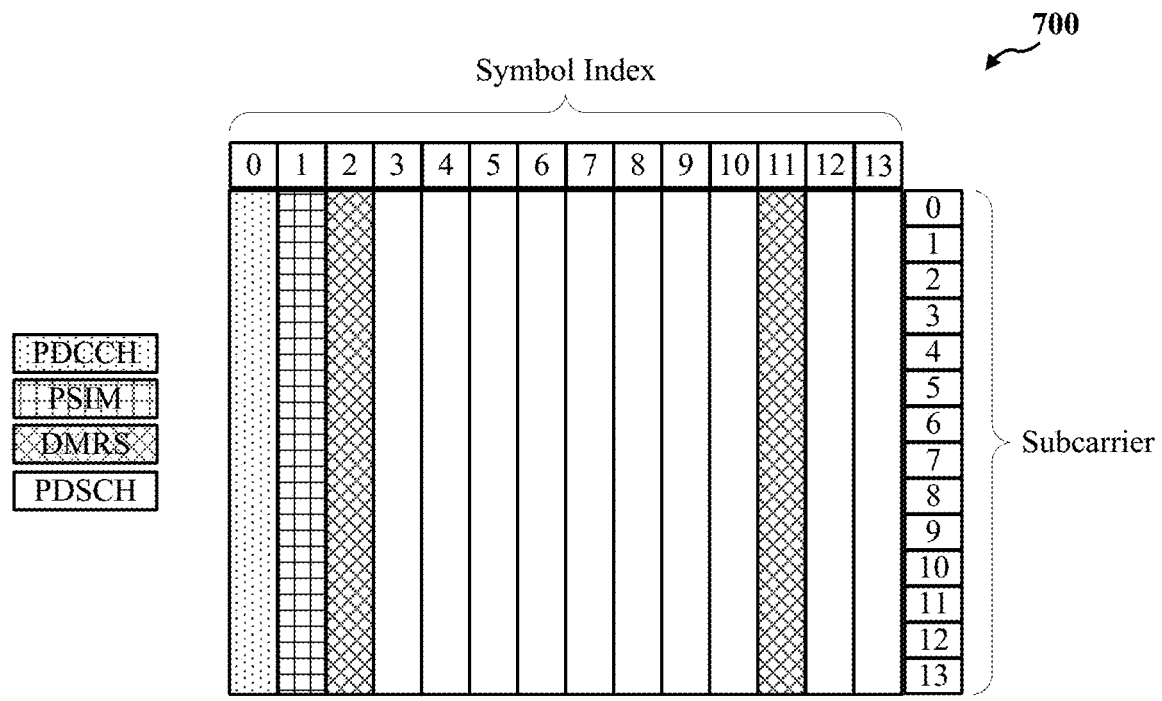
FIG. 7A shows an example downlink subframe configuration usable for communications between a base station and a UE according to one or more aspects.

The RE mapper 440 is configured to map the A-S data signal 404 and the PS signal 407 to one or more OFDM symbols 408. In some implementations, the RE mapper 440 may map the A-S data signal 404 and the PS signal 407 to different OFDM symbols 408 of the same subframe. FIG. 7A shows an example downlink subframe configuration 700 in which the A-S data signal 404 (depicted as PDSCH) and the PS signal 407 (depicted as PSIM) are mapped to different OFDM symbols. As shown in FIG. 7A, the PSIM is mapped to symbol index 1 and the PDSCH is mapped to symbol indices 3-10, 12 and 13. A PDCCH is mapped to symbol index 0 and a demodulation reference signal (DMRS) is mapped to each of symbol indices 2 and 11. In some aspects, the PSIM may be implemented as a special control channel. In some other aspects, the PSIM may be implemented as part of the PDCCH. Still further, in some aspects, the PSIM may be implemented as part of the PDSCH.

Figure 7B:
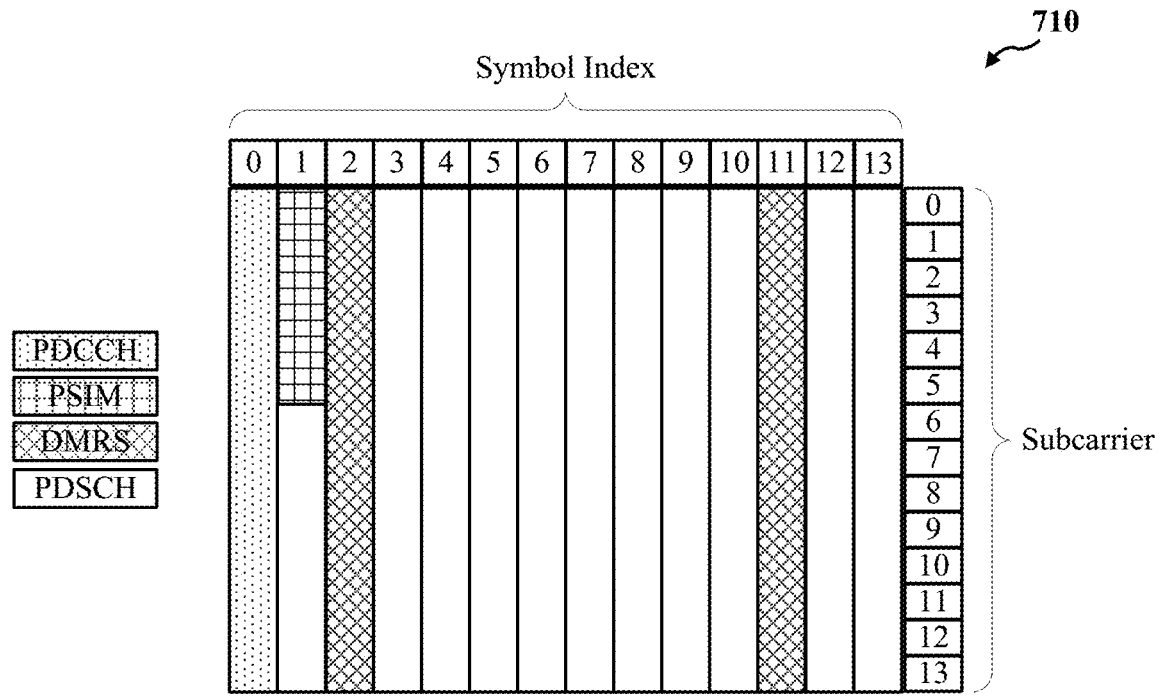
FIG. 7B shows another example downlink subframe configuration usable for communications between a base station and a UE according to one or more aspects.

In some other implementations, the RE mapper 440 may map the PS signal 407 and at least a portion of the A-S data signal 404 to different resource elements within the same OFDM symbol 408 using frequency domain multiplexing (FDM). FIG. 7B shows an example downlink subframe configuration 710 in which the PS signal 407 (depicted as PSIM) and the A-S data signal 404 (depicted as PDSCH) are mapped to the same OFDM symbol. As shown in FIG. 7B, the PSIM is mapped to subcarriers 0-5 of symbol index 1 while the remaining subcarriers 6-13 of symbol index 1 are allocated for the PDSCH. The PDSCH is further mapped to symbol indices 3-10, 12 and 13. A PDCCH is mapped to symbol index 0 and a DMRS is mapped to each of symbol indices 2 and 11.

Figure 8:
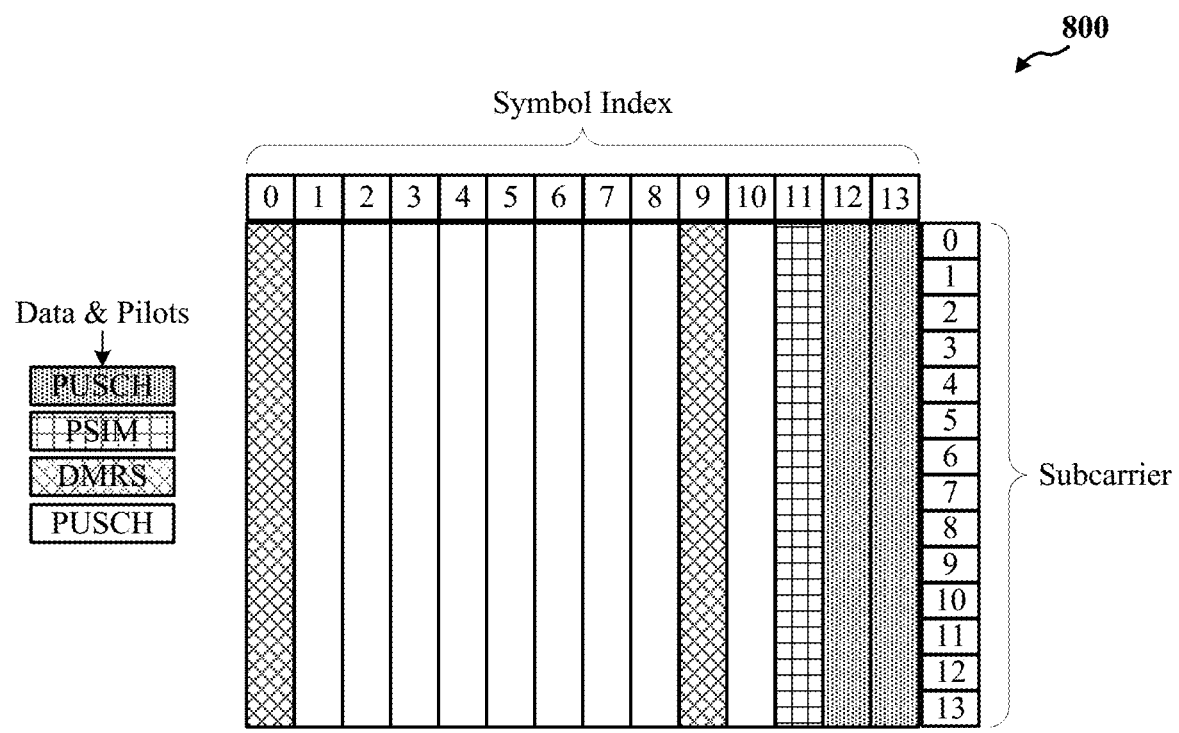
FIG. 8 shows an example uplink subframe configuration usable for communications between a base station and a UE according to one or more aspects.

For implementations in which the transmitting device is a UE, the RE mapper 440 may map the A-S data signal 404 and the PS signal 407 to one or more OFDM symbols 408 of an uplink subframe. FIG. 8 shows an example uplink subframe configuration 800 depicting an example mapping of the A-S data signal 404 (depicted as PUSCH) and the PS signal 407 (depicted as PSIM). As shown in FIG. 8, the PSIM is mapped to symbol index 11 and the PUSCH is mapped to symbol indices 1-8 and 10. A PUSCH carrying data and pilots is mapped to symbol indices 12 and 13 and a DMRS is mapped to each of symbol indices 0 and 9. In some aspects, the PSIM may be implemented as a special control channel. In some other aspects, the PSIM may be implemented as part of the PUSCH. Still further, in some aspects, the PSIM may be implemented as part of the PUSCH carrying data and pilots.

The OFDM symbols 408 are provided to the transmitter 450 for transmission, over a wireless channel, to a receiving device. The transmitter 450 may include one or more power amplifiers to amplify the OFDM symbols 408 transmitted via one or more TX antennas. As described above, the operating range of the power amplifier may depend on the PAPR of the OFDM symbols 408. Because the A-S data signal 404 has a significantly lower PAPR than the original data signal 402, aspects of the present disclosure may improve the efficiency of the power amplifier while reducing the power consumption of the transmitting device.

MIMO implementations of the TX chain 400 may additionally include a precoder 410 and a number (N) of first IFFTs 420. The precoder 410 may apply a precoding matrix (PM) 412 to a number (N) of parallel streams of data symbols 401 to produce a corresponding number (N) of pre-coded data symbols 401'. The pre-coded data symbols 401' are weighted based on the precoding matrix 412 for optimal MIMO transmissions given the channel conditions of the wireless channel. In some implementations, the transmitting device may provide an indication of the precoding matrix 412 to the receiving device for purposes of reconstructing the data symbols 401. In some implementations, the indication may be transmitted in DCI messages on a per-slot basis. In some other implementations, the indication may be periodically transmitted in MAC control elements (CEs) after a given number (M) of slots.

Still further, in some implementations, the transmitting device may transmit a channel state information (CSI) reference signal (RS) to the receiving device. The receiving device may estimate the channel conditions of the wireless channel based on the CSI RS and report a precoding matrix indicator (PMI) back to the transmitting device indicating a recommended precoding matrix to be used given the channel conditions of the wireless channel. In some aspects, the transmitting device may use the precoding matrix recommended by the receiving device. Accordingly, the transmitting device may indicate, in the PDCCH, that the precoding matrix 412 is the same as (or matches) the recommended precoding matrix indicated by the PMI.

For MIMO implementations, the TX chain 400 may perform substantially the same operations as the non-MIMO implementations of the TX chain 400 on multiple concurrent or parallel streams of data symbols 401. For example, the N IFFTs 420 may simultaneously convert N streams of data symbols 401' to N data signals 402, respectively. The peak detector 460 may generate PS information 403 for each of the N data signals 402. The amplitude suppressor 430 may use the PS information 403 to produce N A-S data signals 404 by suppressing peak amplitudes in the N data signals 402, respectively. The PSIM generator 470 may generate a PSIM 405 based on the PS information 403, the modulator 480 may map the PSIM 405 to one or more PS symbols 406, and the IFFT 490 may convert the PS symbols 406 to a PS signal 407. The RE mapper 440 may map the N A-S data signals 404, together with the PS signal 407, to a number of OFDM symbols 408, and the transmitter 450 may transmit the OFDM symbols 408 concurrently via multiple TX antennas.

In some implementations, the transmitting device may verify that the receiving device is capable of decoding or otherwise interpreting the PS signal 407 (or PSIM 405) prior to implementing the peak suppression techniques described herein. For example, the transmitting device may receive capability information, from the receiving device, indicating that the receiving device is able to receive or decode PS signal 407 (or A-S data signal 404). In some aspects, the capability information may be provided as a capability bit in an RRC message sent from the receiving device to the transmitting device. In some other implementations, the transmitting device may transmit its own capability information, to the receiving device, indicating that the transmitting device is able to transmit or generate the PS signal 407 (or A-S data signal 404). For example, such capability information also may be provided as a capability bit in an RRC message sent by the transmitting device to the receiving device.

Figure 9:
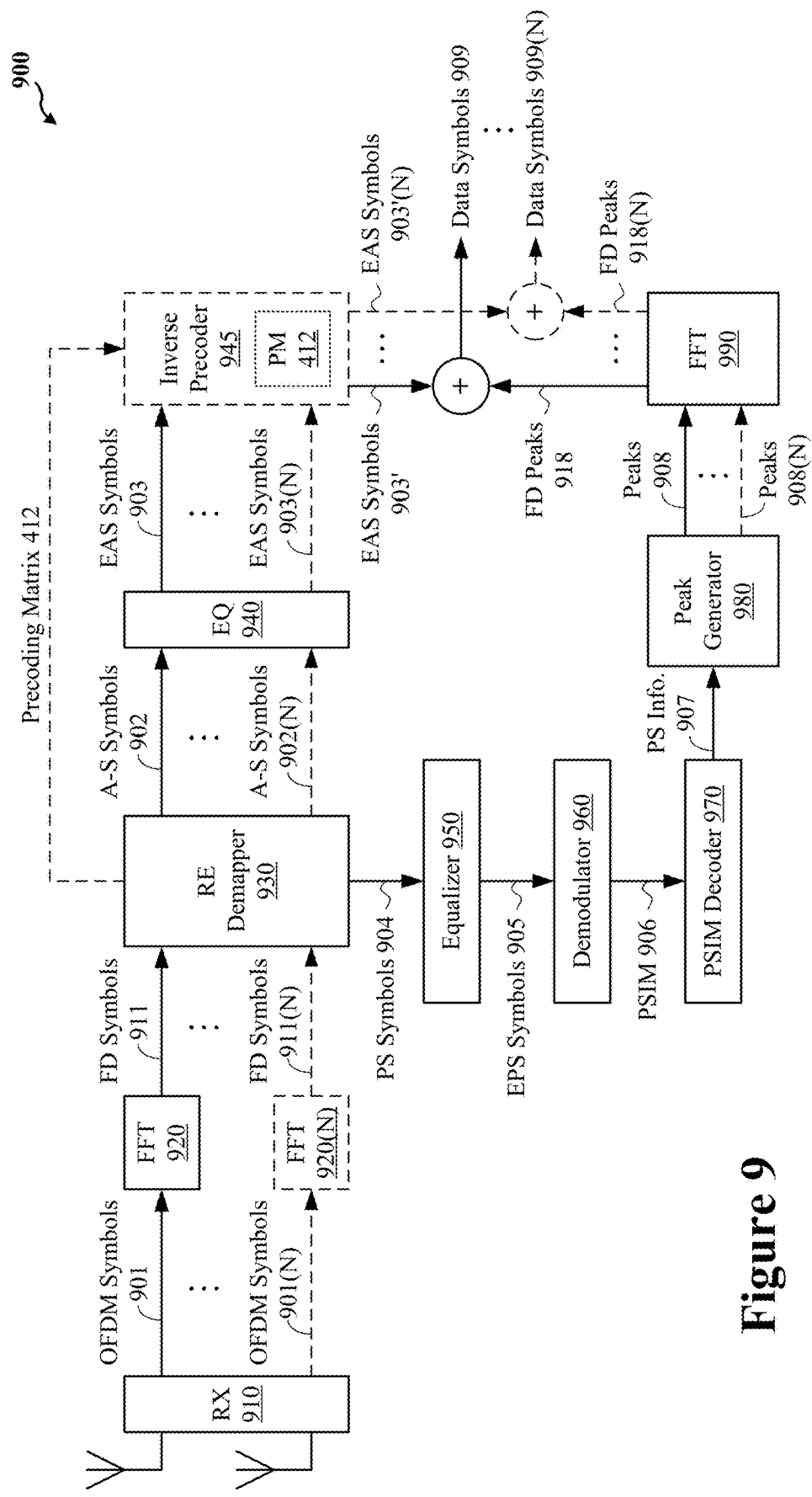
FIG. 9 shows an example receive (RX) chain of a wireless communication device according to one or more aspects.

FIG. 9 shows an example receive (RX) chain 900 of a wireless communication device according to some implementations. In some implementations, the wireless device may be a UE such as UEs 104 or 350 of FIGS. 1 and 3, respectively. With reference for example to FIG. 3, the RX chain 900 may be an example of the RX processor 356 and the receiver 354RX. In some other implementations, the wireless device may be a base station such as base stations 102 or 310 of FIGS. 1 and 3, respectively. With reference for example to FIG. 3, the RX chain 900 may be an example of the RX processor 370 and the receiver 318RX. As shown in FIG. 9, solid lines depict data paths used for MIMO and non-MIMO implementations of the RX chain 900 whereas dotted (or phantom) lines depict additional data paths used only for MIMO implementations of the RX chain 900.

The RX chain 900 includes a receiver (RX) 910, a first fast Fourier transform (FFT) 920, a resource element (RE) demapper 930, a first equalizer (EQ) 940, a second equalizer 950, a demodulator 960, a PSIM decoder 970, a peak generator 980, and a second FFT 990. For non-MIMO implementations, the RX chain 900 may receive OFDM symbols 901 from a transmitting device. The OFDM symbols 901 may be received via one or more antennas of the receiver 910 and amplified by a low-noise amplifier (LNA) within the receiver 910. In some implementations, the OFDM symbols 901 may include an amplitude-suppressed data signal (such as the A-S data signal 404 of FIG. 4) and a peak suppression signal (such as the PS signal 407). As described with respect to FIG. 4, the amplitude-suppressed data signal may be a data signal having chopped peaks. In other words, the amplitudes of samples associated with the peaks are reduced (at the transmitting device) below a threshold amplitude level. The peak suppression signal includes information describing the peaks of the original data signal (such as the amplitude, position, or phase of each peak).

The FFT 920 converts the OFDM symbols 901 from the time domain to the frequency domain. For example, the FFT 920 may produce a series of frequency-domain (FD) symbols 911 representative of the amplitude-suppressed data signal and the peak suppression signal included in the received OFDM symbols 901. Thus, the resulting FD symbols 911 may include amplitude-suppressed (A-S) symbols 902 and peak suppression (PS) symbols 904 corresponding to the amplitude-suppressed data signal and the peak suppression signal, respectively, in the OFDM symbols 901. In some aspects, the OFDM symbols 901 may be parallelized (by a serial-to-parallel converter, not shown for simplicity) at the input of the FFT 920, and the resulting FD symbols 911 may be serialized (by a parallel-to-serial converter, not shown for simplicity) at the output of the FFT 920.

The RE demapper 930 is configured to parse (or demap) the A-S symbols 902 and the PS symbols 904 from the FD symbols 911. In some implementations, the RE demapper 930 may parse the PS symbols 904 from a different OFDM symbol than the A-S symbols 902. With reference for example to FIG. 7A, the PS symbols 904 (depicted as PSIM) are slotted between the PDCCH (in symbol index 0) and a first DMRS (in symbol index 2) whereas the A-S symbols 902 are mapped to the remaining OFDM symbols, with the exception of symbol index 11 (which carries a second DMRS). Accordingly, the RE demapper 930 may identify the PS symbols 904 based, at least in part, on the positions of the PDCCH and the first DMRS. The RE demapper 930 may further identify the A-S symbols 902 based, at least in part, on the position of the second DMRS.

In some other implementations, the RE demapper 930 may parse the PS symbols 904 from an OFDM symbol that also carries at least a portion of the A-S symbols 902. With reference for example to FIG. 7B, the PS symbols 904 (depicted as PSIM) and a portion of the A-S symbols 902 (depicted as PDSCH) are mapped to the same OFDM symbol (in symbol index 1). Accordingly, the RE demapper 930 may first identify the OFDM symbol which carries the PS symbols 904 based, at least in part, on the positions of the PDCCH and the first DMRS. The RE demapper 930 may further separate the PS symbols 904 from the A-S symbols 902 in the identified OFDM symbol based on the resource elements (or subcarriers) on which they are mapped. For example, the RE demapper 930 may parse the PS symbols 904 from subcarriers 0-5 of symbol index 1.

For implementations in which the receiving device is a base station, the RE demapper 930 may parse the A-S symbols 902 and the PS symbols 904 from one or more OFDM symbols of an uplink subframe. With reference for example to FIG. 8, the PS symbols 904 (depicted as PSIM) are slotted between the PUSCH carrying data and pilots (in symbol indices 12 and 13) and the PUSCH (in symbol index 10) immediately following a second DMRS (in symbol index 9). The A-S symbols 902 are mapped to the remaining OFDM symbols, with the exception of symbol index 0 (which carries a first DMRS). Accordingly, the RE demapper 930 may identify the PS symbols 904 based, at least in part, on the positions of the second DMRS and the PUSCH carrying data and pilots. The RE demapper 930 may further identify the A-S symbols 902 based, at least in part, on the positions of the first and second DMRS.

Figure 10A:
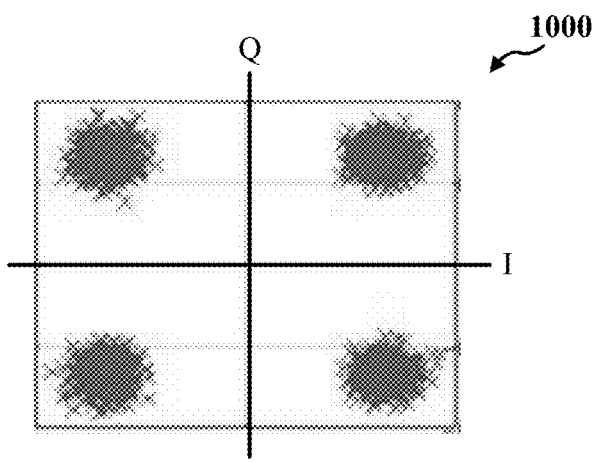
FIG. 10A shows a constellation depicting an example mapping of amplitude-suppressed data symbols according to one or more aspects.
Figure 10B:
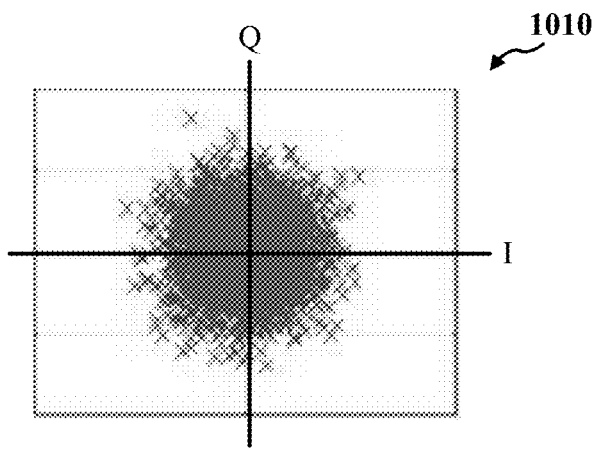
FIG. 10B shows a constellation depicting an example mapping of peak suppression symbols according to one or more aspects.

The A-S symbols 902 and PS symbols 904 are provided to the equalizers 940 and 950, respectively, to correct for distortions caused by the wireless channel. The first equalizer 940 produces equalized A-S (EAS) symbols 903 as a result of the equalization performed on the A-S symbols 902. The EAS symbols 903 may have a relatively poor (or high) EVM as a result of the peak suppression performed at the transmitting device. FIG. 10A shows a QPSK constellation 1000 depicting an example mapping of amplitude-suppressed data symbols (such as the EAS symbols 903). The second equalizer 950 produces equalized PS (EPS) symbols 905 as a result of the equalization performed on the PS symbols 904. FIG. 10B shows a QPSK constellation 1010 depicting an example mapping of peak suppression symbols (such as the PS symbols 905).

The demodulator 960 maps (or demaps) the EPS symbols 905 to a peak suppression information message (PSIM) 906 using digital demodulation techniques. More specifically, the demodulator 960 may reverse the modulation performed by the modulator 480 of FIG. 4. The PSIM decoder 970 decodes the PSIM 906 to recover peak suppression (PS) information 907. As described with respect to FIG. 4, the PS information 907 may include the positions, amplitudes, or phases of each peak associated with the A-S symbols 902. In some implementations, information in the PSIM 906 may be compressed. Accordingly, the PSIM decoder 970 may generate the PS information 907 be decompressing the PSIM 906. More specifically, the PSIM decoder 970 may reverse any compression performed by the PSIM generator 470 of FIG. 4.

In some implementations, the amplitudes of the peaks may be quantized in the PSIM 906. With reference for example to FIG. 6, the peaks 602 may be mapped to a limited number of quantization levels Q1-Q3. As a result, multiple peaks 602 may have the same quantized amplitude. In some implementations, the PSIM decoder 770 may determine the quantized amplitude of each of the peaks 602 based, at least in part, on quantization information received from the transmitting device. As described with respect to FIG. 4, the quantization information may indicate the range of amplitudes A0-A1, A1-A2, and A2-A3 associated with the respective quantization levels Q1-Q3 or an average (mean or median) amplitude of the peaks 602 associated with each quantization level Q1-Q3. The PSIM decoder 770 may determine a quantized amplitude to represent each quantization level based on the quantization information and associated the quantized amplitudes with respective peaks 602 based on the mapping indicated in the PSIM 906.

In some implementations, the positions of at least some of the peaks may be represented as differential values in the PSIM 906. As described with respect to FIG. 4, the PSIM 906 may include the individual position of only one of the peaks in each quantization level (the "initial peak position"). The positions of the remaining peaks may be represented by their distances to the initial peak positions in each quantization level. The PSIM decoder 770 may determine the positions of these peaks by summing or integrating the differential values indicated in the PSIM 906. With reference for example to FIG. 6, position s0 may represent the initial peak position for the second quantization level Q2. The position of the second peak (s5) in Q2 may be determined by adding the difference between the positions of the first and second peaks (Δs0,5) to the initial peak position s0. Further, the position of the third peak (s7) in Q2 may be determined by adding the difference between the positions of the second and third peaks (Δs5,7) to the position of the second peak (s0+Δs0,5).

The peak generator 980 is configured to recreate one or more peaks 908 based on the PS information 907. Each of the peaks 908 may correspond to a respective sample of the original data signal having an amplitude that exceeds a threshold amplitude level. In some implementations, the peak generator 980 may recreate the peaks 908 in a manner such that they can be substituted for corresponding samples in the amplitude-suppressed data signal. For example, the amplitude of each peak 908 may represent the peak amplitude of the corresponding sample from the original data signal. In some other implementations, the peak generator 980 may recreate the peaks 908 in a manner such that they can be combined or added to the corresponding samples in the amplitude-suppressed data signal. For example, the amplitude of each peak 908 may represent a difference between the peak amplitude and the suppressed amplitude of the corresponding sample.

The FFT 990 converts the peaks 908 from the time domain back to the frequency domain. For example, the FFT 990 may produce a series frequency-domain (FD) peaks 918 representative of the peaks 908 generated by the peak generator 980. In some aspects, the peaks 908 may be parallelized (by a serial-to-parallel converter, not shown for simplicity) at the input of the FFT 990, and the resulting FD peaks 918 may be serialized (by a parallel-to-serial converter, not shown for simplicity) at the output of the FFT 990.

The FD peaks 918 are then combined with the EAS symbols 903 to produce reconstructed data symbols 909. With reference for example to FIG. 4, the data symbols 909 may correspond to the original data symbols 401 to be transmitted by the TX chain 400. The manner in which the EAS symbols 903 and the FD peaks 918 are combined may depend on the peaks 908 are generated. For example, if the amplitudes of the peaks 908 represent full peak amplitudes, then the FD peaks 918 may be substituted for (or replace) corresponding samples in the EAS symbols 903. On the other hand, if the amplitudes of the peaks 908 represent differences between the peak amplitudes and the suppressed amplitudes, the FD peaks 918 may be added to the corresponding samples in the EAS symbols 903.

Figure 10C:
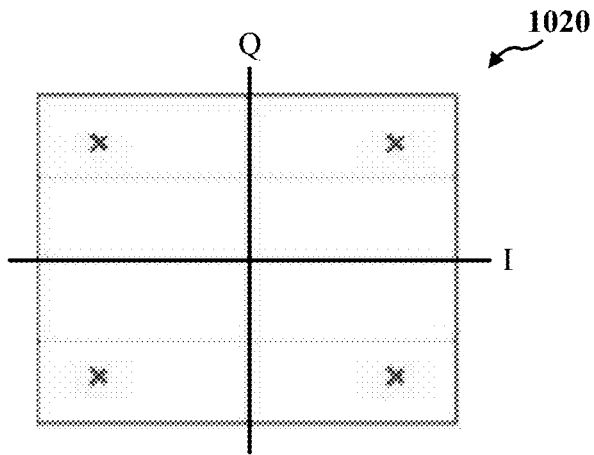
FIG. 10C shows a constellation depicting an example mapping of reconstructed data symbols according to one or more aspects.

FIG. 10C shows a QPSK constellation 1020 depicting an example mapping of reconstructed data symbols (such as the data symbols 909). As shown in FIG. 10C, the EVM associated with each point in the constellation 1020 is significantly smaller than the EVM associated with each point in the constellation 1000 of FIG. 10A. Thus, the data symbols 909 may be precisely and accurately demodulated and decoded to recover the original bits of transmitted data. By combining peak suppression information with amplitude-suppressed data signals, aspects of the present disclosure may reduce the power consumption of the transmitting device while maintaining low EVM at the receiving device.

MIMO implementations of the RX chain 900 may additionally include an inverse precoder 945 and a number (N) of first FFTs 920. The inverse precoder 945 reverses the precoding performed by the precoder 410 of FIG. 4. More specifically, the inverse precoder 945 may apply an inverse of the precoding matrix 412 to a number (N) of parallel streams of EAS symbols 903 to produce a corresponding number (N) of unweighted EAS symbols 903'. In some implementations, the inverse precoder 945 may receive an indication of the precoding matrix 412 from the transmitting device (such as described with respect to FIG. 4). For example, in some aspects, the indication may be included in DCI messages received on a per-slot basis. In some other aspects, the indication may be included in MAC CEs received periodically after a given number (M) of slots. Still further, in some aspects, the indication may be based, at least in part, on a PMI received from the receiving device.

For MIMO implementations, the RX chain 900 may perform substantially the same operations as the non-MIMO implementations of the RX chain 900 on multiple concurrent or parallel streams of OFDM symbols 901. For example, the N FFTs 920 may simultaneously convert N streams of OFDM symbols 901 to N streams of FD symbols 911, respectively. The RE demapper 930 may parse PS symbols 904 and N streams of A-S symbols 902 from the N streams of FD symbols 911, and the first equalizer 940 may perform equalization on the N streams of A-S symbols 902 to produce N streams of EAS symbols 903, respectively. The second equalizer 950 may perform equalization on the PS symbols 904 to produce EPS symbols 905, the demodulator 960 may map the EPS symbols 905 to a PSIM 906, and the PSIM decoder 970 may extract or recover PS information 907 from the PSIM 906. The peak generator 980 may generate peaks 908 for N data streams based on the PSIM 907, and the FFT 990 may convert the peaks 908 to FD peaks 918 for the N data streams. The FD peaks 918 may then be combined with N streams of EAS symbols 903' to produce N streams of reconstructed data symbols 909, respectively.

In some implementations, the receiving device may indicate to the transmitting device that is capable of decoding or otherwise interpreting the PS symbols 904 (or PSIM 906) prior to receiving the OFDM symbols 901. For example, the receiving device may transmit capability information, to the transmitting device, indicating its ability to receive or decode PS symbols 904 (or A-S symbols 902). As described with respect to FIG. 4, the capability information may be provided as a capability bit in an RRC message sent from the receiving device to the transmitting device. In some other implementations, the receiving device may receive capability information, from the transmitting device, indicating that the transmitting device is able to transmit or generate PS symbols 904 (or A-S symbols 902). For example, such capability information also may be provided as a capability bit in an RRC message sent by the transmitting device to the receiving device.

Figure 11A:
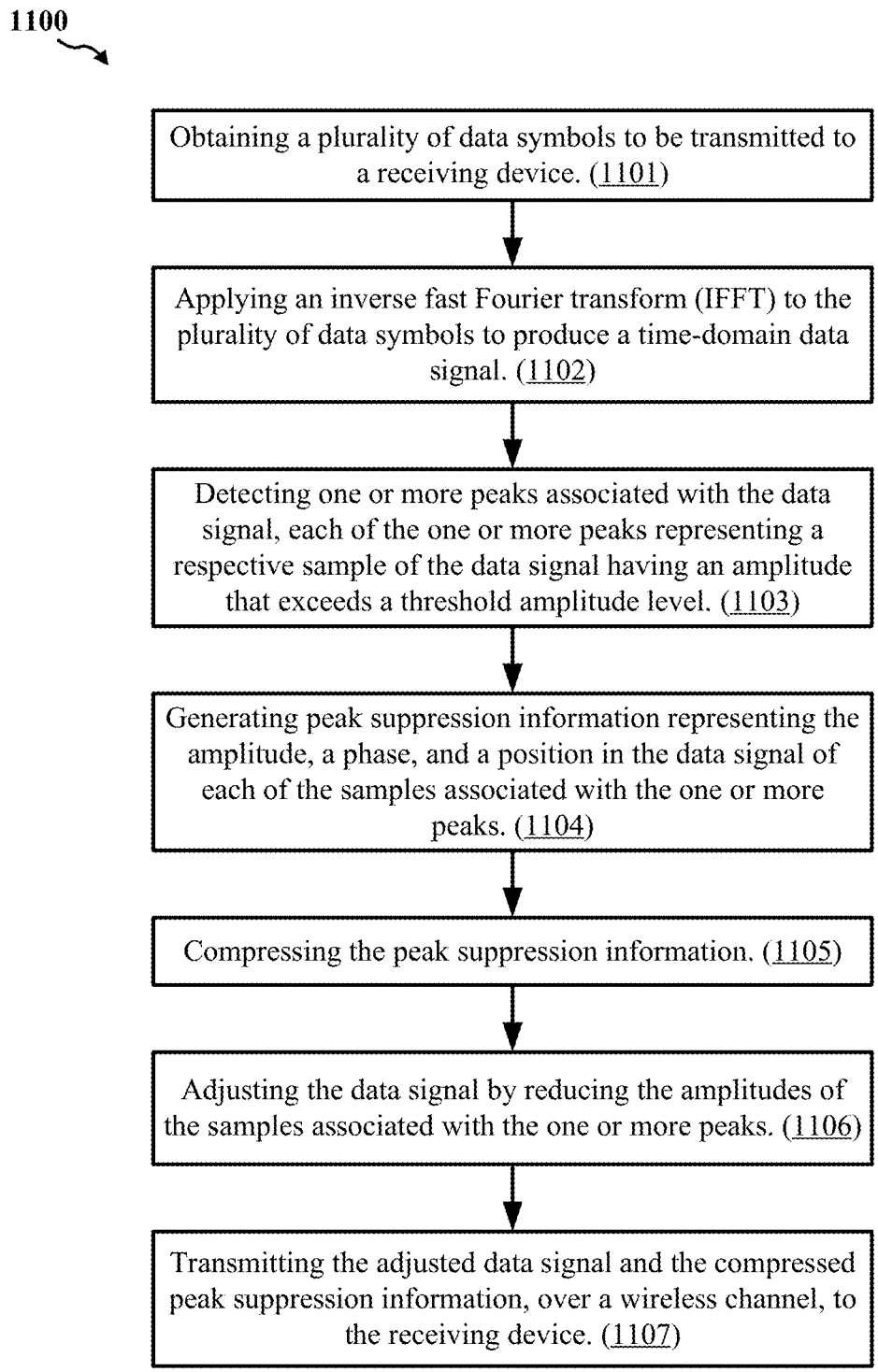
FIG. 11A shows a flowchart illustrating an example process for wireless communication that supports reducing peak-to-average power ratio (PAPR) using peak suppression information messages according to one or more aspects.

FIG. 11A shows a flowchart illustrating an example process 1100 for wireless communication that supports reducing PAPR using peak suppression information messages according to some implementations. In some implementations, the process 1100 may be performed by a wireless communication device operating as or within a network node, such as one of the base stations 102 or 310 described above with reference to FIGS. 1 and 3, respectively. In some other implementations, the process 1100 may be performed by a wireless communication device operating as or within a UE, such as one of the UEs 104 or 350 described above with respect to FIGS. 1 and 3, respectively.

In some implementations, the process 1100 begins in block 1101 with obtaining a plurality of data symbols to be transmitted to a receiving device. In block 1102, the process 1100 proceeds with applying an IFFT to the plurality of data symbols to produce a time-domain data signal. In block 1103, the process 1100 proceeds with detecting one or more peaks associated with the data signal, each of the one or more peaks representing a respective sample of the data signal having an amplitude that exceeds a threshold amplitude level. In block 1104, the process 1100 proceeds with generating peak suppression information representing the amplitude, a phase, and a position of each of the samples associated with the one or more peaks. In block 1105, the process 1100 proceeds with compressing the peak suppression information. In block 1106, the process 1100 proceeds with adjusting the data signal by reducing the amplitudes of the samples associated with the one or more peaks. In block 1107, the process 1100 proceeds with transmitting the adjusted data signal and the compressed peak suppression information, over a wireless channel, to the receiving device.

FIG. 11B shows a flowchart illustrating an example process 1110 for wireless communication that supports reducing PAPR using peak suppression information messages according to some implementations. In some implementations, the process 1110 may be performed by a wireless communication device operating as or within a network node, such as one of the base stations 102 or 310 described above with reference to FIGS. 1 and 3, respectively. In some other implementations, the process 1110 may be performed by a wireless communication device operating as or within a UE, such as one of the UEs 104 or 350 described above with respect to FIGS. 1 and 3, respectively.

With reference for example to FIG. 11A, the process 1110 may be a more detailed implementation of the compression operation described in block 1105 of the process 1100. For example, the process 1110 may begin, in block 1111, after the reception of the data symbols in block 1101, after the application of the IFFT in block 1102, after the detection of the peaks in block 1103, and after the generation of the peak suppression information in block 1104.

In block 1111, the process 1110 begins by quantizing the amplitudes of the samples associated with the one or more peaks into one or more quantization levels, where each of the quantization levels represents a respective range of amplitudes. In some implementations, the process 1110 may proceed to block 1112 with determining a difference between the positions of two samples mapped to the same quantization level. In block 1113, the process 1110 proceeds with mapping the positions of the samples having the quantized amplitudes to the respective quantization levels, where the compressed peak suppression information includes an indication of the positions of the samples mapped to each of the quantization levels. in some implementations, the process 1110 may proceed to block 1114 with transmitting, to the receiving device, quantization information indicating at least one of the range of amplitudes associated with each of the quantization levels or an average amplitude of the samples associated with each of the quantization levels.

Figure 12A:
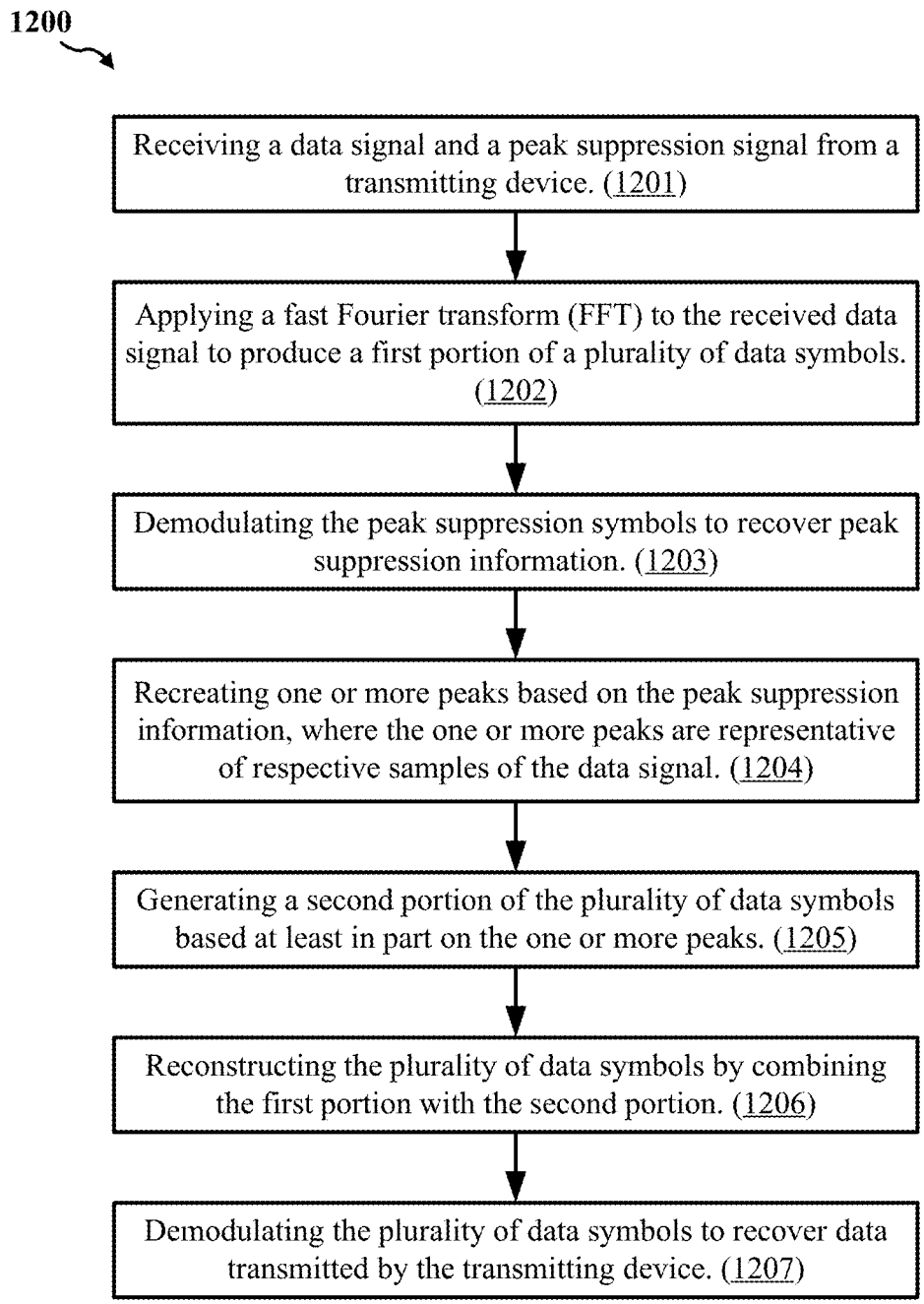
FIG. 12A shows a flowchart illustrating an example process for wireless communication that supports reducing PAPR using peak suppression information messages according to one or more aspects.

FIG. 12A shows a flowchart illustrating an example process 1200 for wireless communication that supports reducing PAPR using peak suppression information messages according to some implementations. In some implementations, the process 1200 may be performed by a wireless communication device operating as or within a UE, such as one of the UEs 104 or 350 described above with respect to FIGS. 1 and 3, respectively. In some other implementations, the process 1200 may be performed by a wireless communication device operating as or within a network node, such as one of the base stations 102 or 310 described above with reference to FIGS. 1 and 3, respectively.

In some implementations, the process 1200 begins in block 1201 with receiving a data signal and a peak suppression signal from a transmitting device. In block 1202, the process 1200 proceeds with applying an FFT to the received data signal to produce a first portion of a plurality of data symbols. In block 1203, the process 1200 proceeds with demodulating the peak suppression symbols to recover peak suppression information. In block 1204, the process 1200 proceeds with recreating one or more peaks based on the peak suppression information, where the one or more peaks are representative of respective samples of the data signal. In block 1205, the process 1200 proceeds with generating a second portion of the plurality of data symbols based at least in part on the one or more peaks. In block 1206, the process 1200 proceeds with reconstructing the plurality of data symbols by combining the first portion with the second portion. In block 1207, the process 1200 proceeds with demodulating the plurality of data symbols to recover data transmitted by the transmitting device.

FIG. 12B shows a flowchart illustrating an example process 1210 for wireless communication that supports reducing PAPR using peak suppression information messages according to some implementations. In some implementations, the process 1210 may be performed by a wireless communication device operating as or within a UE, such as one of the UEs 104 or 350 described above with respect to FIGS. 1 and 3, respectively. In some other implementations, the process 1210 may be performed by a wireless communication device operating as or within a network node, such as one of the base stations 102 or 310 described above with reference to FIGS. 1 and 3, respectively.

With reference for example to FIG. 12A, the process 1210 may be a more detailed implementation of the operation for the peak recreation operation described in block 1204 of the process 1200. For example, the process 1210 may begin, in block 1211, after the reception of the data signal and the peak suppression signal in block 1201, after the application of the FFT in block 1202, and after the demodulation of the peak suppression symbols in block 1203.

In block 1211, the process 1210 begins by determining an amplitude and a position, relative to the data signal, of each of the one or more peaks based at least in part on a mapping of the peaks to one or more quantization levels. In some implementations, the process 1210 may proceed to block 1212 with receiving, from the transmitting device, quantization information indicating at least one of a range of amplitudes associated with each of the quantization levels or an average amplitude of the samples associated with each of the quantization levels. In some implementations, the process 1210 may proceed to block 1213 with integrating differences between the positions of two or more peaks mapped to the same quantization level.

In some aspects, techniques for enabling reduced PAPR of wireless transmissions may include additional aspects, such as any single aspect or any combination of aspects described below or in connection with one or more other processes or devices described elsewhere herein. In a first aspect, techniques for enabling reduced PAPR of wireless transmissions may include obtaining a plurality of data symbols to be transmitted to a receiving device; applying an IFFT to the plurality of data symbols to produce a time-domain data signal; detecting one or more peaks associated with the data signal, each of the one or more peaks representing a respective sample of the data signal having an amplitude that exceeds a threshold amplitude level; generating peak suppression information representing the amplitude, a phase, and a position in the data signal of each of the samples associated with the one or more peaks; compressing the peak suppression information; adjusting the data signal by reducing the amplitudes of the samples associated with the one or more peaks; and transmitting the adjusted data signal and the compressed peak suppression information, over a wireless channel, to the receiving device. In some examples, the techniques in the first aspect may be implemented in a method or process. In some other examples, the techniques of the first aspect may be implemented in a wireless communication device, such as a UE or a component of a UE, as illustrative, non-limiting examples. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a second aspect, in combination with the first aspect, the compressed peak suppression information includes only the amplitudes and the positions of the samples associated with the one or more peaks.

In a third aspect, in combination with one or more of the first aspect or second aspect, compressing of the peak suppression information includes quantizing the amplitudes of the samples associated with the one or more peaks into one or more quantization levels, each of the quantization levels representing a respective range of amplitudes.

In a fourth aspect, in combination with the third aspect, compressing of the peak suppression information comprises mapping the positions of the samples having the quantized amplitudes to the respective quantization levels, the compressed peak suppression information including an indication of the positions of the samples mapped to each of the quantization levels.

In a fifth aspect, in combination with the fourth aspect, the techniques further include transmitting, to the receiving device, quantization information indicating at least one of the range of amplitudes associated with each of the quantization levels or an average amplitude of the samples associated with each of the quantization levels.

In a sixth aspect, in combination with the fifth aspect, the quantization information is transmitted prior to the transmission of the adjusted data signal and the compressed peak suppression information.

In a seventh aspect, in combination with the fourth aspect, the mapping includes determining a difference between the positions of two samples mapped to the same quantization level, the difference being representative of the positions of at least one of the two samples in the compressed peak suppression information.

In an eighth aspect, in combination with one or more of the first through the seventh aspect, the techniques further include transmitting, to the receiving device, capability information indicating that the wireless communication device is capable of generating the peak suppression information.

In a ninth aspect, in combination with one or more of the first through the eighth aspect, the techniques further include receiving, from the receiving device, capability information indicating that the receiving device is capable of interpreting the peak suppression information.

In a tenth aspect, in combination with one or more of the first through the ninth aspect, the techniques further include determining an average transmit power associated with the data signal.

In an eleventh aspect, in combination with the tenth aspect, the techniques further include determining the threshold amplitude level based at least in part on the average transmit power and a target PAPR.

In a twelfth aspect, in combination with one or more of the first through the eleventh aspect, the adjusting includes reducing the amplitudes of the samples associated with the one or more peaks to a first amplitude value, the first amplitude value being less than or equal to the threshold amplitude level.

In a thirteenth aspect, in combination with one or more of the first through the twelfth aspect, the transmitting the adjusted data signal and the compressed peak suppression information includes modulating the compressed peak suppression information to produce one or more peak suppression symbols.

In a fourteenth aspect, in combination with the thirteenth aspect, the transmitting the adjusted data signal and the compressed peak suppression information includes applying the IFFT to the one or more peak suppression symbols to produce a peak suppression signal.

In a fifteenth aspect, in combination with the fourteenth aspect, the transmitting the adjusted data signal and the compressed peak suppression information includes mapping the adjusted data signal and the peak suppression signal to one or more OFDM symbols of a communication subframe.

In a sixteenth aspect, in combination with the fifteenth aspect, the adjusted data signal and the peak suppression signal are mapped to different OFDM symbols.

In a seventeenth aspect, in combination with the fifteenth, the peak suppression signal and at least a portion of the adjusted data signal are mapped to different resource elements of the same OFDM symbol.

In an eighteenth aspect, in combination with the first aspect through the seventeenth aspect, the techniques further include applying a precoding matrix to the plurality of data symbols.

In a nineteenth aspect, in combination with the eighteenth aspect, the techniques further include transmitting an indication of the precoding matrix to the receiving device.

In a twentieth aspect, in combination with the eighteenth aspect or the nineteenth aspect, the techniques further include receiving a PMI from the receiving device, the PMI indicating a recommended precoding matrix.

In a twenty-first aspect, in combination with the twentieth aspect, the techniques further include selecting the precoding matrix based at least in part on the recommended precoding matrix indicated in the PMI.

In a twenty-second aspect, in combination with one or more of the nineteenth aspect through the twenty-first aspect, the indication of the precoding matrix is transmitted in a PDCCH and indicates that the precoding matrix is the same as the recommended precoding matrix.

In a twenty-third aspect, in combination with one or more of the nineteenth aspect through the twenty-first aspect, the indication of the precoding matrix is transmitted in a MAC-CE.

In a twenty-fourth aspect, in combination with one or more of the nineteenth aspect through the twenty-first aspect, the indication of the precoding matrix is transmitted in a DCI message In one or more aspects, techniques for enabling reduced PAPR of wireless transmissions may include additional aspects, such as any single aspect or any combination of aspects described below or in connection with one or more other processes or devices described elsewhere herein. In a twenty-fifth aspect, techniques for enabling reduced PAPR of wireless transmissions may include receiving a data signal and a peak suppression signal from a transmitting device; applying an FFT to the received data signal to produce a first portion of a plurality of data symbols; applying the FFT to the peak suppression signal to produce one or more peak suppression symbols; demodulating the peak suppression symbols to recover peak suppression information; recreating one or more peaks based on the peak suppression information, the one or more peaks being representative of respective samples of the data signal; generating a second portion of the plurality of data symbols based at least in part on the one or more peaks; reconstructing the plurality of data symbols by combining the first portion with the second portion; and demodulating the plurality of data symbols to recover data transmitted by the transmitting device. In some examples, the techniques in the twenty-fifth aspect may be implemented in a method or process. In some other examples, the techniques of the twenty-fifth aspect may be implemented in a wireless communication device, such as a UE or a component of a UE, as illustrative, non-limiting examples. In some examples, the wireless communication device may include at least one processing unit or system (which may include an application processor, a modem or other components) and at least one memory device coupled to the processing unit. The processing unit may be configured to perform operations described herein with respect to the wireless communication device. In some examples, the memory device includes a non-transitory computer-readable medium having program code stored thereon that, when executed by the processing unit, is configured to cause the wireless communication device to perform the operations described herein.

In a twenty-sixth aspect, in combination with the twenty-fifth aspect, the peak suppression information indicates an amplitude and a position, relative to the data signal, of each of the one or more peaks.

In a twenty-seventh aspect, in combination with the twenty-fifth aspect or the twenty-sixth aspect, the peak suppression information includes a mapping of the one or more peaks to one or more quantization levels, each of the quantization levels representing a respective range of amplitudes.

In a twenty-eighth aspect, in combination with the twenty-seventh aspect, the recreating of the one or more peaks includes determining an amplitude and a position, relative to the data signal, of each of the one or more peaks based at least in part on the mapping of the peaks to the quantization levels.

In a twenty-ninth aspect, in combination with the twenty-eighth aspect, the determining includes receiving, from the transmitting device, quantization information indicating at least one of the range of amplitudes associated with each of the quantization levels or an average amplitude of the samples associated with each of the quantization levels.

In a thirtieth aspect, in combination with the twenty-ninth aspect, the quantization information is received prior to the reception of the data signal and the peak suppression signal.

In a thirty-first aspect, in combination with the twenty-eighth aspect, the peak suppression information indicates differences between the positions of two or more peaks mapped to the same quantization level.

In a thirty-second aspect, in combination with the thirty-first aspect, the determining of the position of the one or more peaks includes integrating the differences between the positions of two or more peaks mapped to the same quantization level.

In a thirty-third aspect, in combination with one or more of the twenty-fifth aspect through the thirty-second aspect, the techniques further include transmitting, to the transmitting device, capability information indicating that the wireless communication device is capable of interpreting the peak suppression information.

In a thirty-fourth aspect, in combination with one or more of the twenty-fifth aspect through the thirty-fourth aspect, the techniques further include receiving, from the transmitting device, capability information indicating that the transmitting device is capable of generating the peak suppression information.

In a thirty-fifth aspect, in combination with one or more of the twenty-fifth aspect through the thirty-third aspect, the one or more peaks have amplitudes that exceed a threshold amplitude level.

In a thirty-sixth aspect, in combination with one or more of the twenty-fifth aspect through the thirty-fifth aspect, the threshold amplitude level is based at least in part on an average transmit power and a target PAPR.

In a thirty-seventh aspect, in combination with one or more of the twenty-fifth aspect through the thirty-sixth aspect, the generating the second portion includes applying the FFT to the one or more peaks to produce the second portion of the plurality of data symbols.

In a thirty-eighth aspect, in combination with one or more of the twenty-fifth aspect through the thirty-seventh aspect, the techniques further include demapping the data signal and the peak suppression signal from different OFDMA symbols of a communication subframe.

In a thirty-ninth aspect, in combination with one or more of the twenty-fifth aspect through the thirty-seventh aspect, the techniques further include demapping the data signal and the peak suppression signal from different resource elements of the same OFDMA symbol of a communication subframe.

In a fortieth aspect, in combination with one or more of the twenty-fifth aspect through the thirty-ninth aspect, the techniques further include receiving an indication of a precoding matrix from the transmitting device.

In a forty-first aspect, in combination with the fortieth aspect, the techniques further include applying an inverse of the precoding matrix to the first portion of the plurality of data symbols.

In a forty-second aspect, in combination with the forty-first aspect, the techniques further include determining a recommended precoding matrix to be used for communications with the transmitting device.

In a forty-third aspect, in combination with the forty-second aspect, the techniques further include transmitting a PMI to the transmitting device, the PMI indicating the recommended precoding matrix.

In a forty-fourth aspect, in combination with one or more of the fortieth aspect through the forty-third aspect, the indication of the precoding matrix is received in a PDCCH and indicates that the precoding matrix is the same as the recommended precoding matrix.

In a forty-fifth aspect, in combination with one or more of the fortieth aspect through the forty-third aspect, the indication of the precoding matrix is received in a MAC-CE.

In a forty-sixth aspect, in combination with one or more of the fortieth aspect through the forty-third aspect, the indication of the precoding matrix is received in a DCI message.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

What is claimed is:

1. A method of wireless communication performed by a wireless communication device, the method comprising:
obtaining a plurality of data symbols to be transmitted to a receiving device;
applying an inverse fast Fourier transform (IFFT) to the plurality of data symbols to produce a time-domain data signal;
detecting one or more peaks associated with the data signal, each of the one or more peaks representing a respective sample of the data signal having an amplitude that exceeds a threshold amplitude level;
generating peak suppression information representing the amplitude, a phase, and a position in the data signal of each of the samples associated with the one or more peaks;
compressing the peak suppression information;
adjusting the data signal by reducing the amplitudes of the samples associated with the one or more peaks; and
transmitting the adjusted data signal and the compressed peak suppression information, over a wireless channel, to the receiving device.

2. The method of claim 1, wherein the compressed peak suppression information includes only the amplitudes and the positions of the samples associated with the one or more peaks.

3. The method of claim 1, wherein the compressing of the peak suppression information comprises:
quantizing the amplitudes of the samples associated with the one or more peaks into one or more quantization levels, each of the quantization levels representing a respective range of amplitudes; and
mapping the positions of the samples having the quantized amplitudes to the respective quantization levels, the compressed peak suppression information including an indication of the positions of the samples mapped to each of the quantization levels.

4. The method of claim 3, further comprising:
transmitting, to the receiving device, quantization information indicating at least one of the range of amplitudes associated with each of the quantization levels or an average amplitude of the samples associated with each of the quantization levels; and
wherein the quantization information is transmitted prior to the transmission of the adjusted data signal and the compressed peak suppression information.

5. The method of claim 3, wherein the mapping comprises determining a difference between the positions of two samples mapped to the same quantization level, the difference being representative of the positions of at least one of the two samples in the compressed peak suppression information.

6. The method of claim 1, further comprising:
transmitting, to the receiving device, capability information indicating that the wireless communication device is capable of generating the peak suppression information; and
receiving, from the receiving device, capability information indicating that the receiving device is capable of interpreting the peak suppression information.

7. The method of claim 1, further comprising:
determining an average transmit power associated with the data signal; and
determining the threshold amplitude level based at least in part on the average transmit power and a target peak-to-average power ratio (PAPR).

8. The method of claim 1, wherein the adjusting comprises reducing the amplitudes of the samples associated with the one or more peaks to a first amplitude value, the first amplitude value being less than or equal to the threshold amplitude level.

9. The method of claim 1, wherein the transmitting comprises:
modulating the compressed peak suppression information to produce one or more peak suppression symbols;
applying the IFFT to the one or more peak suppression symbols to produce a peak suppression signal; and
mapping the adjusted data signal and the peak suppression signal to one or more orthogonal frequency-division multiplexing (OFDM) symbols of a communication subframe, wherein:
the adjusted data signal and the peak suppression signal are mapped to different OFDM symbols; or
the peak suppression signal and at least a portion of the adjusted data signal are mapped to different resource elements of the same OFDM symbol.

10. The method of claim 1, further comprising:
applying a precoding matrix to the plurality of data symbols;
transmitting an indication of the precoding matrix to the receiving device;
receiving a precoding matrix indication (PMI) from the receiving device, the PMI indicating a recommended precoding matrix; and
selecting the precoding matrix based at least in part on the recommended precoding matrix indicated in the PMI.

11. The method of claim 10, wherein:
the indication of the precoding matrix is transmitted in a physical downlink control channel (PDCCH) and indicates that the precoding matrix is the same as the recommended precoding matrix; and
the indication of the precoding matrix is transmitted in a medium access control (MAC)-control element (CE) or a downlink control information (DCI) message.

12. A wireless communication device comprising:
at least one processor; and
at least one memory communicatively coupled with the at least one processor and storing processor-readable code that, when executed by the at least one processor, causes the wireless communication device to:
obtain a plurality of data symbols to be transmitted to a receiving device;
apply an inverse fast Fourier transform (IFFT) to the plurality of data symbols to produce a time-domain data signal;
detect one or more peaks associated with the data signal, each of the one or more peaks representing a respective sample of the data signal having an amplitude that exceeds a threshold amplitude level;
generate peak suppression information representing the amplitude, a phase, and a position in the data signal of each of the samples associated with the one or more peaks;
compress the peak suppression information;
adjust the data signal by reducing the amplitudes of the samples associated with the one or more peaks; and
transmit the adjusted data signal and the compressed peak suppression information, over a wireless channel, to the receiving device.

13. The wireless communication device of claim 12, wherein, to compress the peak suppression information, the processor-readable code that, when executed by the at least one processor, causes the wireless communication device to:

quantize the amplitudes of the samples associated with the one or more peaks into one or more quantization levels, each of the quantization levels representing a respective range of amplitudes; and map the positions of the samples having the quantized amplitudes to the respective quantization levels, the compressed peak suppression information including an indication of the positions of the samples mapped to each of the quantization levels.

14. The wireless communication device of claim 13, wherein, to map the positions of the samples, the processor-readable code that, when executed by the at least one processor, causes the wireless communication device to determine a difference between the positions of two samples mapped to the same quantization level, the difference being representative of the positions of at least one of the two samples in the compressed peak suppression information.

15. The wireless communication device of claim 12, wherein, to the adjusted data signal and the compressed peak suppression information, the processor-readable code that, when executed by the at least one processor, causes the wireless communication device to:

modulate the compressed peak suppression information to produce one or more peak suppression symbols;

apply the IFFT to the one or more peak suppression symbols to produce a peak suppression signal; and map the adjusted data signal and the peak suppression signal to one or more orthogonal frequency-division multiplexing (OFDM) symbols of a communication subframe.

16. A method of wireless communication performed by a wireless communication device, the method comprising:

receiving a data signal and a peak suppression signal from a transmitting device;

applying a fast Fourier transform (FFT) to the received data signal to produce a first portion of a plurality of data symbols;

applying the FFT to the peak suppression signal to produce one or more peak suppression symbols;

demodulating the peak suppression symbols to recover peak suppression information;

recreating one or more peaks based on the peak suppression information, the one or more peaks being representative of respective samples of the data signal;

generating a second portion of the plurality of data symbols based at least in part on the one or more peaks;

reconstructing the plurality of data symbols by combining the first portion with the second portion; and demodulating the plurality of data symbols to recover data transmitted by the transmitting device.

17. The method of claim 16, wherein the peak suppression information indicates an amplitude and a position, relative to the data signal, of each of the one or more peaks.

18. The method of claim 16, wherein:

the peak suppression information includes a mapping of the one or more peaks to one or more quantization levels, each of the quantization levels representing a respective range of amplitudes; and the recreating of the one or more peaks comprises determining an amplitude and a position, relative to the data signal, of each of the one or more peaks based at least in part on the mapping of the peaks to the quantization levels.

19. The method of claim 18, wherein:

the determining comprises receiving, from the transmitting device, quantization information indicating at least one of the range of amplitudes associated with each of the quantization levels or an average amplitude of the samples associated with each of the quantization levels; and the quantization information is received prior to the reception of the data signal and the peak suppression signal.

20. The method of claim 18, wherein:

the peak suppression information indicates differences between the positions of two or more peaks mapped to the same quantization level; and, the determining of the position of the one or more peaks comprises integrating the differences between the positions of two or more peaks mapped to the same quantization level.

21. The method of claim 16, further comprising:

transmitting, to the transmitting device, capability information indicating that the wireless communication device is capable of interpreting the peak suppression information; and receiving, from the transmitting device, capability information indicating that the transmitting device is capable of generating the peak suppression information.

22. The method of claim 16, wherein the one or more peaks have amplitudes that exceed a threshold amplitude level.

23. The method of claim 22, wherein the threshold amplitude level is based at least in part on an average transmit power and a target peak-to-average power ratio (PAPR).

24. The method of claim 16, wherein the generating comprises applying the FFT to the one or more peaks to produce the second portion of the plurality of data symbols; and further comprising:

demapping the data signal and the peak suppression signal from different OFDMA symbols of a communication subframe; or demapping the data signal and the peak suppression signal from different resource elements of the same OFDMA symbol of a communication subframe.

25. The method of claim 16, further comprising:

receiving an indication of a precoding matrix from the transmitting device;

applying an inverse of the precoding matrix to the first portion of the plurality of data symbols;

determining a recommended precoding matrix to be used for communications with the transmitting device; and transmitting a precoding matrix indication (PMI) to the transmitting device, the PMI indicating the recommended precoding matrix.

26. The method of claim 25, wherein:

the indication of the precoding matrix is received in a physical downlink control channel (PDCCH) and indicates that the precoding matrix is the same as the recommended precoding matrix; and the indication of the precoding matrix is received in a medium access control (MAC)-control element (CE) or a downlink control information (DCI) message.

27. A wireless communication device comprising:

at least one processor; and at least one memory communicatively coupled with the at least one processor and storing processor-readable code that, when executed by the at least one processor, causes the wireless communication device to:

receive a data signal and a peak suppression signal from a transmitting device;

apply a fast Fourier transform (FFT) to the received data signal to produce a first portion of a plurality of data symbols;

apply the FFT to the peak suppression signal to produce one or more peak suppression symbols;

demodulate the peak suppression symbols to recover peak suppression information;

recreate one or more peaks based on the peak suppression information, the one or more peaks being representative of respective samples of the data signal;

generate a second portion of the plurality of data symbols based at least in part on the one or more peaks;

reconstruct the plurality of data symbols by combining the first portion with the second portion; and demodulate the plurality of data symbols to recover data transmitted by the transmitting device.

28. The wireless communication device of claim 27, wherein the peak suppression information includes a mapping of the one or more peaks to one or more quantization levels, each of the quantization levels representing a respective range of amplitudes.

29. The wireless communication device of claim 27, wherein the peak suppression information indicates differences between the positions of two or more peaks mapped to the same quantization level.

30. The wireless communication device of claim 27, wherein, to generate the second portion of the plurality of data symbols, the processor-readable code that, when executed by the at least one processor, causes the wireless communication device to apply the FFT to the one or more peaks to produce the second portion of the plurality of data symbols.

* * * * *